US008040951B2

(12) United States Patent
Kitada et al.

(10) Patent No.: US 8,040,951 B2
(45) Date of Patent: Oct. 18, 2011

(54) INFORMATION PROCESSING APPARATUS AND PROGRAM FOR USE IN THE SAME

(75) Inventors: Noriaki Kitada, Tokorozawa (JP); Kosuke Uchida, Ome (JP); Satoshi Hoshina, Ome (JP); Yoshihiro Kikuchi, Ome (JP); Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1600 days.

(21) Appl. No.: 11/210,308

(22) Filed: Aug. 24, 2005

(65) Prior Publication Data

US 2006/0067406 A1 Mar. 30, 2006

(30) Foreign Application Priority Data

Sep. 30, 2004 (JP) ................................. 2004-286541
Sep. 30, 2004 (JP) ................................. 2004-286542
Sep. 30, 2004 (JP) ................................. 2004-287495
Sep. 30, 2004 (JP) ................................. 2004-287496
Sep. 30, 2004 (JP) ................................. 2004-287498

(51) Int. Cl.
*H04N 7/12* (2006.01)

(52) U.S. Cl. ......... 375/240.16; 375/240.12; 375/240.13; 375/240.14; 375/240.15

(58) Field of Classification Search . 375/240.12–240.16
See application file for complete search history.

(56) References Cited

U.S. PATENT DOCUMENTS

| | | | |
|---|---|---|---|
| 5,384,869 A * | 1/1995 | Wilkinson et al. | 382/240 |
| 5,777,900 A * | 7/1998 | Takeuchi et al. | 702/190 |
| 5,872,866 A | 2/1999 | Strongin et al. | |
| 5,986,709 A | 11/1999 | Lee | |
| 5,987,179 A * | 11/1999 | Riek et al. | 382/236 |
| 6,353,683 B1 | 3/2002 | Horiike | |

(Continued)

FOREIGN PATENT DOCUMENTS

EP 0 910 219 A2 4/1999

(Continued)

OTHER PUBLICATIONS

Notification of a Official Action with English translation mailed Feb. 10, 2009 in corresponding application in Japan (Japanese Patent Application No. 2004-286541).

(Continued)

*Primary Examiner* — Jay Au Patel
*Assistant Examiner* — Geepy Pe
(74) *Attorney, Agent, or Firm* — Blakely, Sokoloff, Taylor & Zafman LLP

(57) ABSTRACT

An information processing apparatus includes a unit that executes a de-blocking filter process for each of decoded pictures, a unit that executes a motion compensation prediction process that generates an inter-frame prediction signal, from one or more pictures that are subjected to the de-blocking filter process, a unit that executes an intra-frame prediction process that generates an intra-frame prediction signal, a unit that adds one of the inter-frame prediction signal and the intra-frame prediction signal to a prediction error signal corresponding to the to-be-decoded picture to decode the to-be-decoded picture, and a unit that executes, when a load on the information processing apparatus is greater than a predetermined reference value, a process that skips execution of the de-blocking filter process and generates the inter-frame prediction signal, which corresponds to the to-be-decoded picture, from the one or more decoded pictures that are not subjected to the de-blocking filter process.

6 Claims, 28 Drawing Sheets

U.S. PATENT DOCUMENTS

| | | |
|---|---|---|
| 6,377,621 B2 | 4/2002 | Borer |
| 6,704,362 B2 | 3/2004 | Peng et al. |
| 2001/0017977 A1 | 8/2001 | Umeda |
| 2003/0076885 A1 | 4/2003 | Chen et al. |
| 2003/0095603 A1 | 5/2003 | Lan et al. |
| 2003/0167472 A1 | 9/2003 | Barbanson et al. |
| 2003/0206587 A1 | 11/2003 | Gomila |
| 2003/0206664 A1 | 11/2003 | Gomila et al. |
| 2004/0062310 A1 | 4/2004 | Xue et al. |
| 2004/0105498 A1 | 6/2004 | Ahn et al. |

FOREIGN PATENT DOCUMENTS

| | | |
|---|---|---|
| EP | 1387585 | 9/2002 |
| JP | 04-220081 | 8/1992 |
| JP | 05-122681 | 5/1993 |
| JP | 09-322175 | 12/1997 |
| JP | 10-210483 | 8/1998 |
| JP | 11-122624 | 4/1999 |
| JP | 11-146398 | 5/1999 |
| JP | 11-215494 | 8/1999 |
| JP | 2001-245294 | 9/2001 |
| JP | 2002-135779 | 5/2002 |
| JP | 2002-199405 | 7/2002 |
| JP | 2002-204404 | 7/2002 |
| JP | 2003-116132 | 4/2003 |
| JP | 2003-169337 | 6/2003 |
| JP | 2003-304538 | 10/2003 |
| JP | 2003-319398 | 11/2003 |
| JP | 2004-7360 | 1/2004 |
| JP | 2004-129055 | 4/2004 |
| JP | 2004-200991 | 7/2004 |
| JP | 2004242286 | 8/2004 |
| WO | WO 2004/030369 A1 | 4/2004 |

OTHER PUBLICATIONS

European Search Report for application No. 05107386.4 dated Aug. 7, 2008 entitled :Information Processing Apparatus and Program for Use in the Same.

Japanese Office Action dated Jun. 17, 2008 for application No. 2004-286541 (U.S. Appl. No. 11/210,308), entitled Information Processing Apparatus and Program for Use in the Same (English Translation).

Japanese Patent Application No. 2004-287498, Official Letter of Inquiry, mailed Oct. 15, 2010, (English Translation).

* cited by examiner

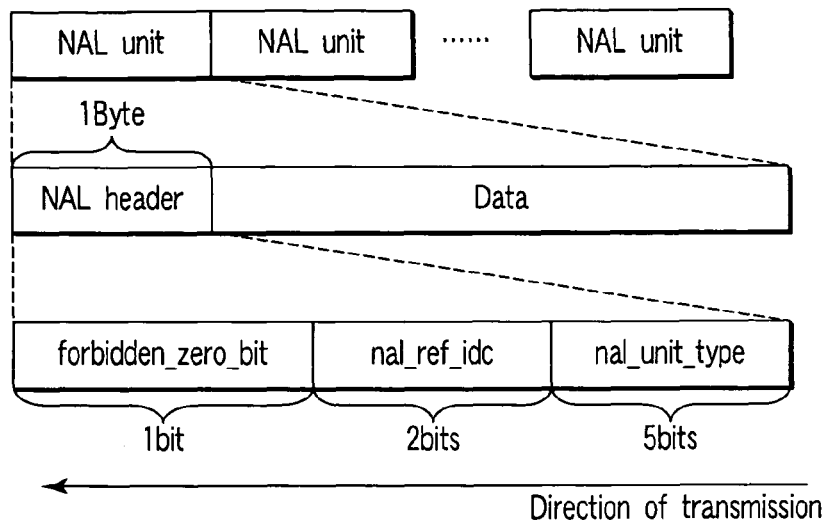
F I G. 14
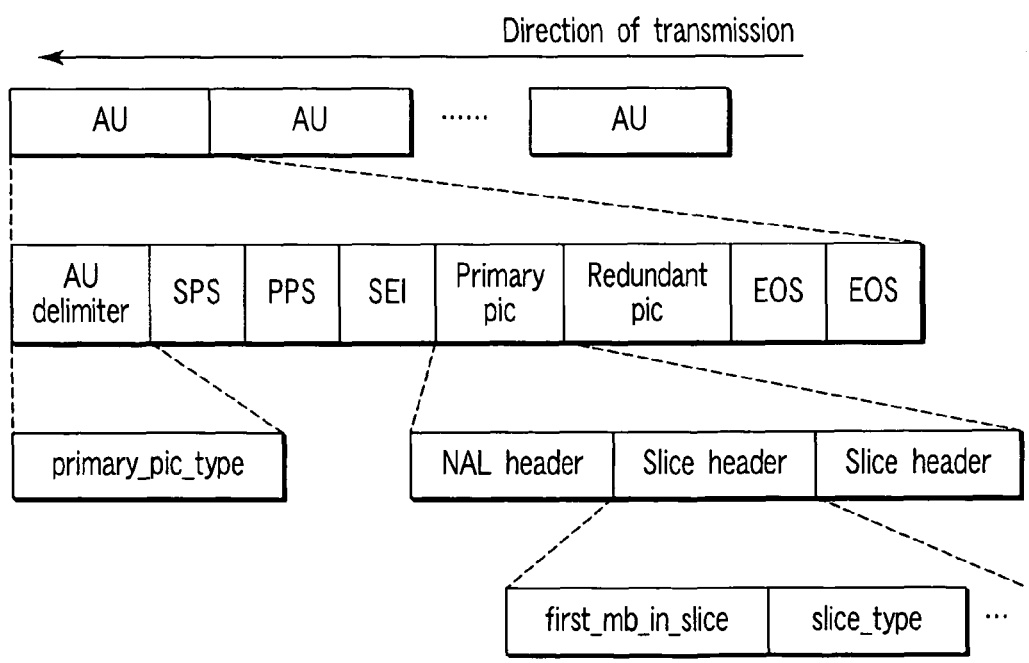
F I G. 15

| nal_unit_type | Content |
|---|---|
| 0 | Not defined |
| 1 | Slice of non-IDR picture |
| 2 | Slice data partition A |
| 3 | Slice data partition B |
| 4 | Slice data partition C |
| 5 | Slice of IDR picture |
| 6 | SEI(Suplemental Enhancement Information) |
| 7 | SPS(Sequence Parameter Set) |
| 8 | PPS(Picture Parameter Set) |
| 9 | AU delimiter |
| 10 | End of sequence |
| 11 | End of stream |
| 12 | FFiller data |
| 13-23 | reserved |
| 24-31 | Not defined |

FIG. 18

| primary_pic_type | Kinds of slices included in primary picture |
|---|---|
| 0 | I |
| 1 | I, P |
| 2 | I, P, B |
| 3 | SI |
| 4 | SI, SP |
| 5 | I, SI |
| 6 | I, SI, P, SP |
| 7 | I, SI, P, SP, B |

FIG. 19

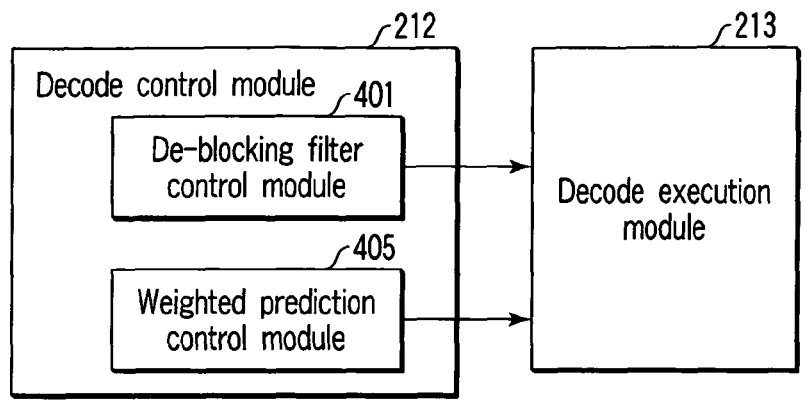
F I G. 36
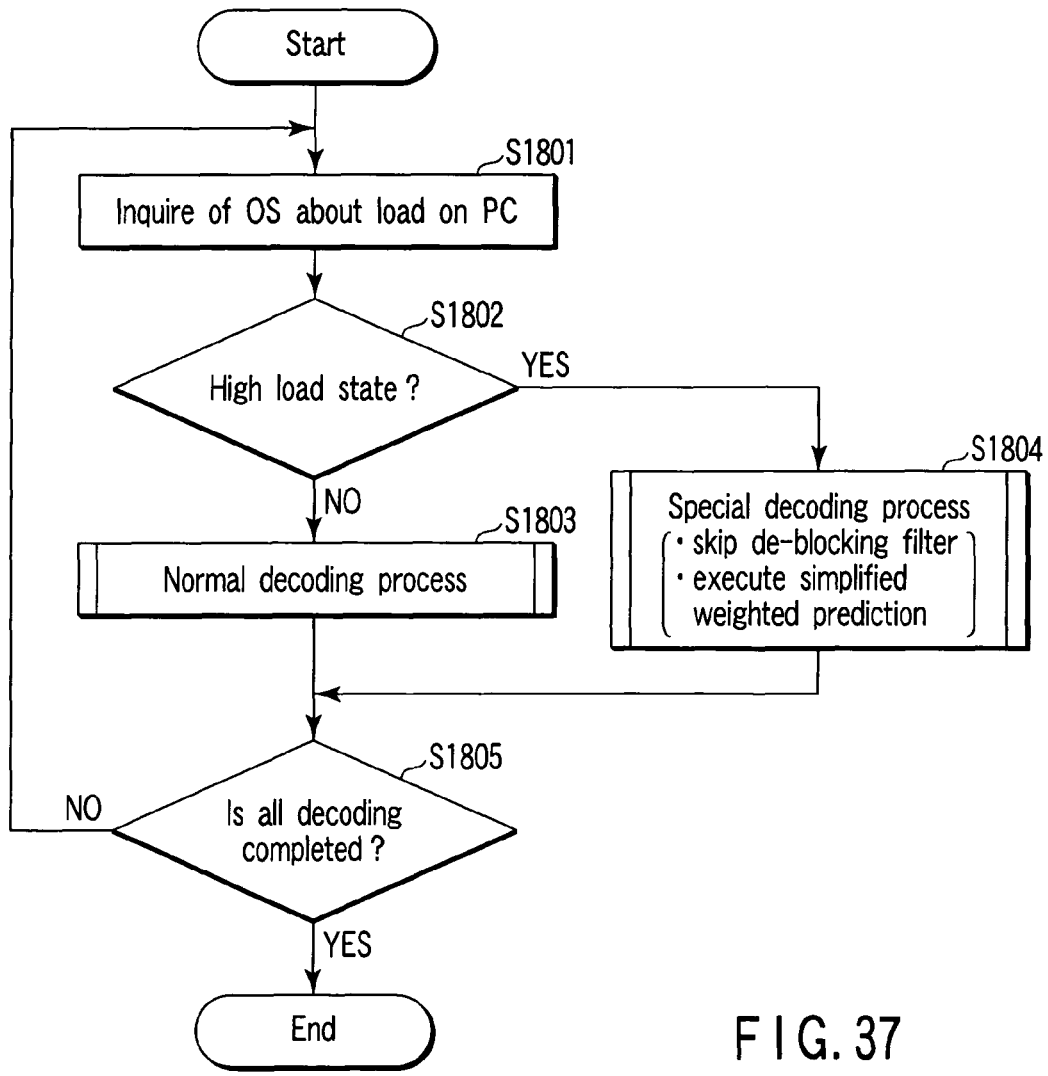
F I G. 37

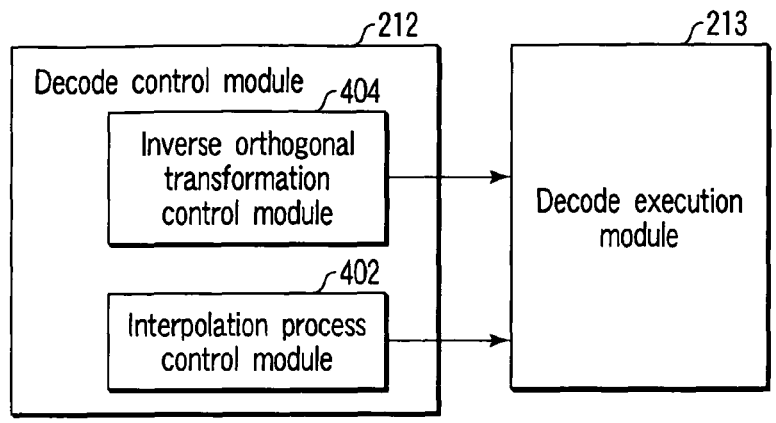
F I G. 39
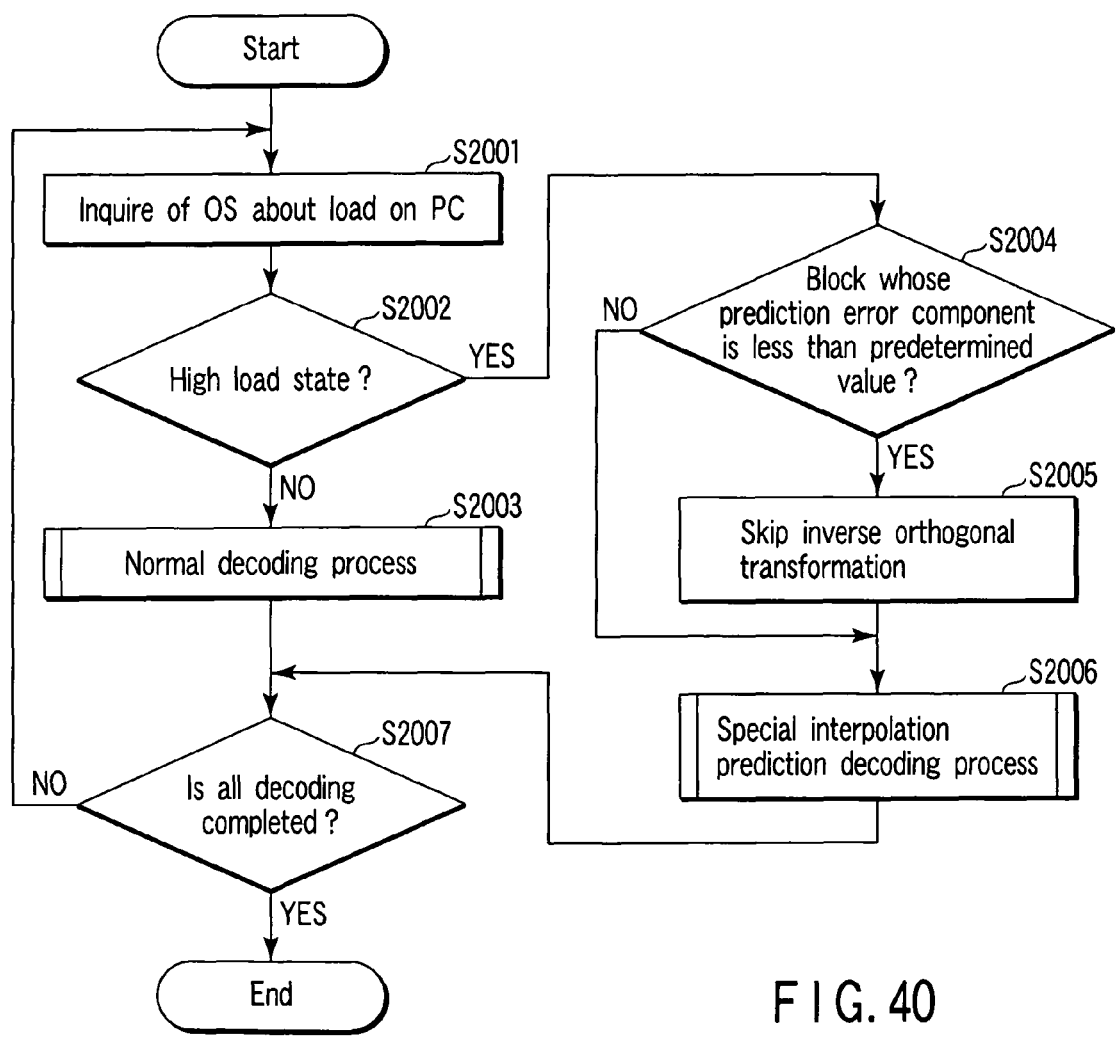
F I G. 40

INFORMATION PROCESSING APPARATUS AND PROGRAM FOR USE IN THE SAME

CROSS-REFERENCE TO RELATED APPLICATIONS

This application is based upon and claims the benefit of priority from prior Japanese Patent Applications No. 2004-286541, filed Sep. 30, 2004; No. 2004-286542, filed Sep. 30, 2004; No. 2004-287495, filed Sep. 30, 2004; No. 2004-287496, filed Sep. 30, 2004; and No. 2004-287498, filed Sep. 30, 2004, the entire contents of all of which are incorporated herein by reference.

BACKGROUND OF THE INVENTION

1. Field of the Invention

The present invention relates to an information processing apparatus such as a personal computer, and a program for decoding for use in the apparatus.

2. Description of the Related Art

In recent years, personal computers having AV functions similar to those of audio/video (AV) devices, such as a DVD (Digital Versatile Disc) player and a TV apparatus, have been developed.

This type of personal computer employs a software decoder that decodes compression-encoded motion video streams by software. The use of the software decoder enables a processor (CPU) to decode compression-encoded motion video streams, without the need to provide dedicated hardware.

Principal compression-encoding techniques include motion-compensation inter-frame prediction coding such as MPEG (Moving Picture Coding Experts Group) 2, or MPEG 4.

Jpn. Pat. Appln. KOKAI Publication No. 2001-245294 discloses a system in which a compression-encoded stream is decoded and an output video signal that is obtained by the decoding is subjected to post-filtering in order to improve the image quality. In order to prevent occurrence of frame dropping, this system makes use of a technique wherein the content of a filtering process that is to be executed in the post-filtering process is changed to reduce the time that is needed for the post-filtering process.

The post-filtering process, however, is a process that is executed outside the decoder. In a case where a delay occurs in the decoding process itself of the software decoder, even if the time needed for the post-filtering process is reduced, occurrence of frame dropping cannot be prevented.

Jpn. Pat. Appln. KOKAI Publication No. 2003-169337 discloses a system wherein a prediction picture is generated using a picture with fractional-pixel precision. In this system, in the case where a B-picture is decoded in order to reduce the amount of processing that is needed for a pixel interpolation process, the pixel interpolation for a reference picture is executed using a filter having a less number of taps than a filter that is used when a P-picture is decoded.

In the system of KOKAI No. 2003-169337, however, the filter with a small number of taps is always used when the B-picture is decoded. This leads to a decrease in image quality of reproduced video.

Jpn. Pat. Appln. KOKAI Publication No. 11-146398 discloses a system wherein an inverse DCT process for a P-picture or a B-picture is skipped in order to reduce the amount of processing that is needed for the inverse DCT process.

In the system of KOKAI No. 11-146398, however, the inverse DCT process for the P-picture or B-picture is always skipped, regardless of the value of the DCT coefficient. As a result, the image quality of reproduced video may considerably be degraded.

Recently, attention has been paid to H.264/AVC (Advanced Video Coding) standard as a next-generation motion picture compression-encoding technique. The H.264/AVC standard is a compression-encoding technique with a higher efficiency than the conventional compression-encoding technique such as MPEG2 or MPEG4. Thus, each of the encoding process and decoding process according to the H.264/AVC standard requires a greater amount of processing than in the conventional compression-encoding technique such as MPEG2 or MPEG4.

In a personal computer that is designed to decode a motion picture stream, which is compression-encoded by H.264/AVC standard, by software, if the load on the system increases, a delay would occur in the decoding process itself. Consequently, there is a danger that smooth motion picture reproduction cannot be executed.

Under the circumstances, it is necessary to provide a new function for realizing smooth motion picture reproduction.

BRIEF SUMMARY OF THE INVENTION

According to an embodiment of the present invention, there is provided an information processing apparatus that decodes a compression-encoded motion video stream, comprising: means for executing a de-blocking filter process for reducing a block distortion in each of decoded pictures; means for executing a motion compensation prediction process that generates an inter-frame prediction signal, which corresponds to a to-be-decoded picture, from one or more pictures that are subjected to the de-blocking filter process; means for executing an intra-frame prediction process that generates an intra-frame prediction signal from the to-be-decoded picture; means for adding one of the inter-frame prediction signal and the intra-frame prediction signal to a prediction error signal that corresponds to the to-be-decoded picture, thereby to decode the to-be-decoded picture; means for detecting a load on the information processing apparatus; and means for executing, in a case where the detected load is greater than a predetermined reference value, a de-blocking filter control process that skips execution of the de-blocking filter process and generates the inter-frame prediction signal, which corresponds to the to-be-decoded picture, from the one or more decoded pictures that are not subjected to the de-blocking filter process.

According to another embodiment of the present invention, there is provided an information processing apparatus that decodes a compression-encoded motion video stream, comprising: means for executing a motion compensation prediction process that includes a process of subjecting a decoded picture to a pixel interpolation process, and a process of generating an inter-frame prediction signal, which corresponds to a to-be-decoded picture, from the picture that is subjected to the pixel interpolation process, on the basis of motion vector information that is included in the motion video stream; means for adding the inter-frame prediction signal to a prediction error signal that corresponds to the to-be-decoded picture, thereby to decode the to-be-decoded picture; means for detecting a load on the information processing apparatus; and means for executing, in a case where the detected load is greater than a predetermined reference value, an interpolation prediction control process that alters a content of the pixel interpolation process, thereby to reduce the load on the information processing apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14 shows the structure of a NAL unit of the motion video stream shown in FIG. 13;

FIG. 15 shows the structure of an access unit of the motion video stream shown in FIG. 13;

FIG. 18 is a view for explaining the kinds of NAL units included in the motion video stream shown in FIG. 13;

FIG. 19 is a view for explaining the kinds of slices included in the motion video stream shown in FIG. 13;

FIG. 36 shows the structure of a decode control module that is used in a computer according to a ninth embodiment of the invention;

FIG. 37 is a flow chart illustrating the procedure of a decoding process that is executed by a video reproduction application program for use in the ninth embodiment;

FIG. 39 shows the structure of a decode control module that is used in a computer according to a tenth embodiment of the invention;

FIG. 40 is a flow chart illustrating the procedure of a decoding process that is executed by a video reproduction application program for use in the tenth embodiment;

DETAILED DESCRIPTION OF THE INVENTION

Embodiments of the present invention will now be described with reference to the accompanying drawings.

First Embodiment

Figure 1:
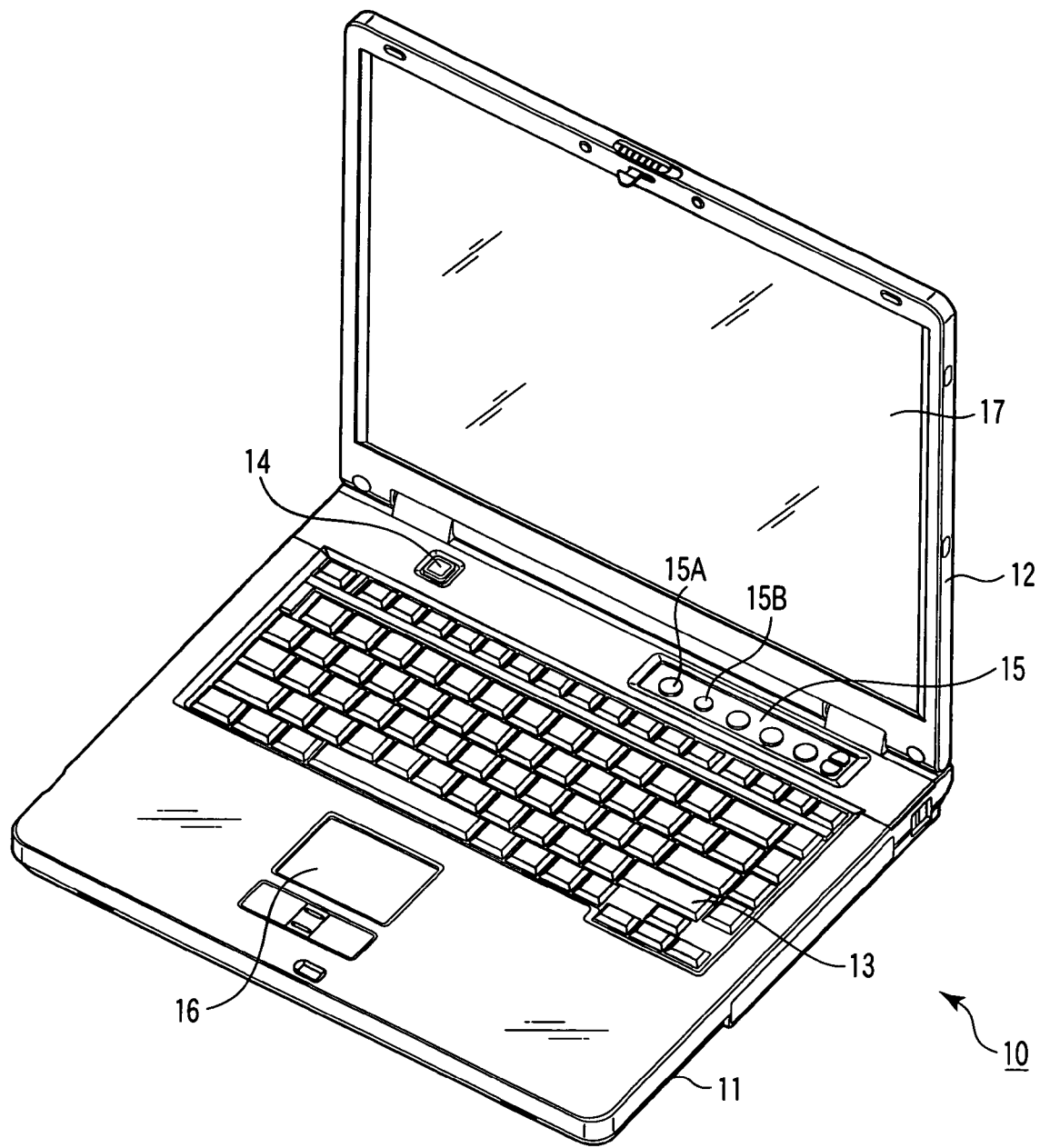
FIG. 1 is a perspective view that shows an external appearance of a computer according to a first embodiment of the present invention.
Figure 2:
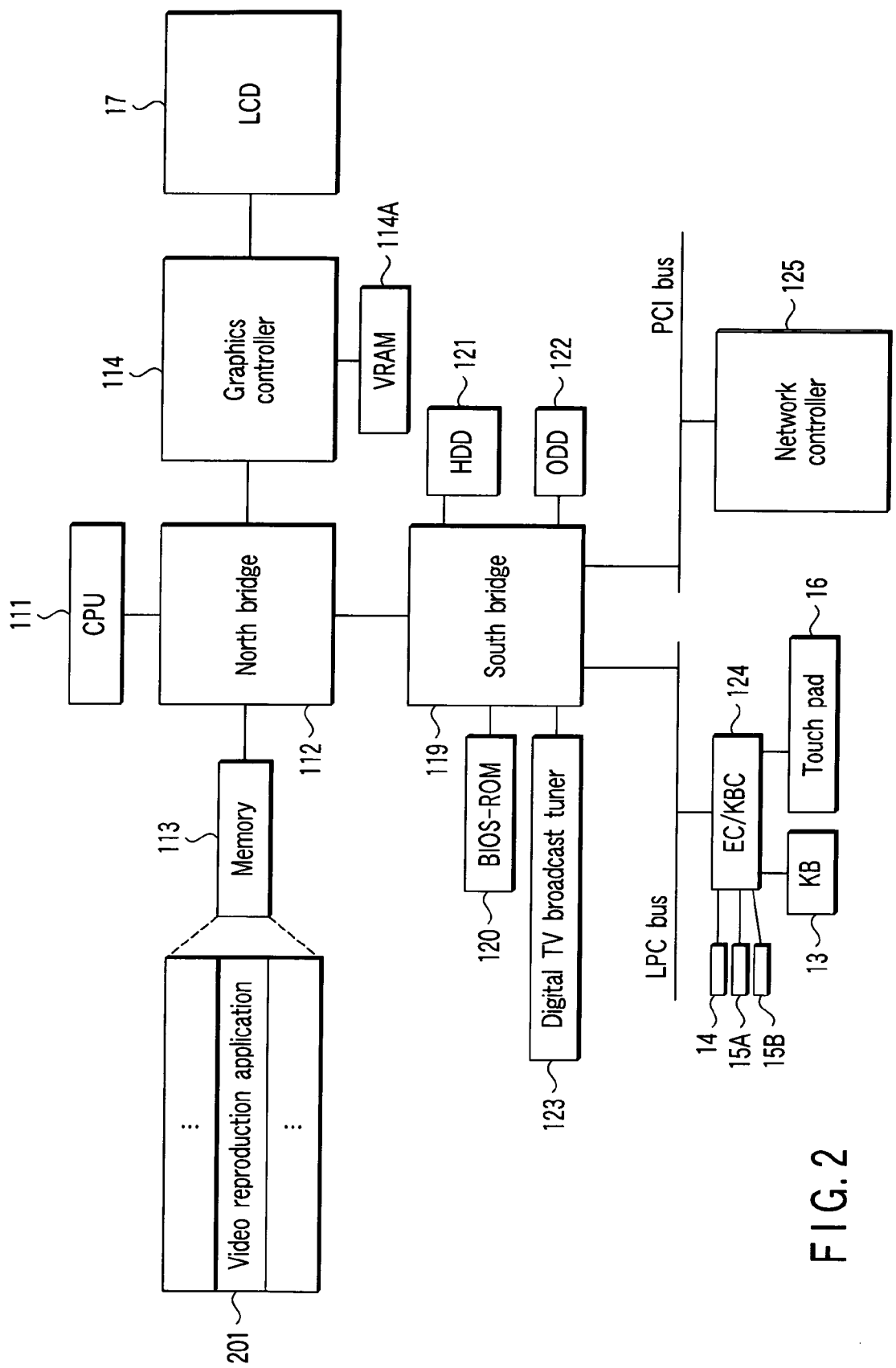
FIG. 2 is a block diagram that shows a system configuration of the computer shown in FIG. 1.

Referring to FIG. 1 and FIG. 2, the structure of an information processing apparatus according to a first embodiment of the invention is described. The information processing apparatus is realized, for example, as a notebook personal computer 10.

FIG. 1 is a perspective view that shows the state in which a display unit of the notebook personal computer 10 is opened. The computer 10 comprises a computer main body 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing. A keyboard 13, a power button 14 for powering on/off the computer 10, an input operation panel 15 and a touch pad 16 are disposed on the top surface of the computer main body 11.

The input operation panel 15 is an input device that inputs an event corresponding to a pressed button. The input operation panel 15 has a plurality of buttons for activating a plurality of functions. The buttons include a TV activation button 15A and a DVD (Digital Versatile Disc) activation button 15B. The TV activation button 15A is a button for activating a TV function for reproducing and recording broadcast program data such as digital TV broadcast program data. When the TV activation button 15A is pressed by the user, an application program for executing the TV function is automatically started. The DVD activation button 15B is a button for reproducing video content that is recorded on a DVD. When the DVD activation button 15B is pressed by the user, an application program for reproducing video content is automatically started.

Next, referring to FIG. 2, the system configuration of the computer 10 is described.

The computer 10, as shown in FIG. 2, comprises a CPU 111, a north bridge 112, a main memory 113, a graphics controller 114, a south bridge 119, a BIOS-ROM 120, a hard disk drive (HDD) 121, an optical disc drive (ODD) 122, a digital TV broadcast tuner 123, an embedded controller/keyboard controller IC (EC/KBC) 124, and a network controller 125.

The CPU 111 is a processor that is provided in order to control the operation of the computer 10. The CPU 111 executes an operating system (OS) and various application programs such as a video reproduction application program 201, which are loaded from the hard disk drive (HDD) 121 into the main memory 113.

The video reproduction application program 201 is software for decoding and reproducing compression-encoded motion video data. The video reproduction application program 201 is a software decoder according to H.264/AVC standard. The video reproduction application program 201 has a function for decoding a motion video stream that is compression-encoded by a coding scheme defined by H.264/AVC standard (e.g. a digital TV broadcast program received by digital TV broadcast tuner 123, or video content of HD (High Definition) standard that is read out of optical disc drive (ODD) 122).

Figure 3:
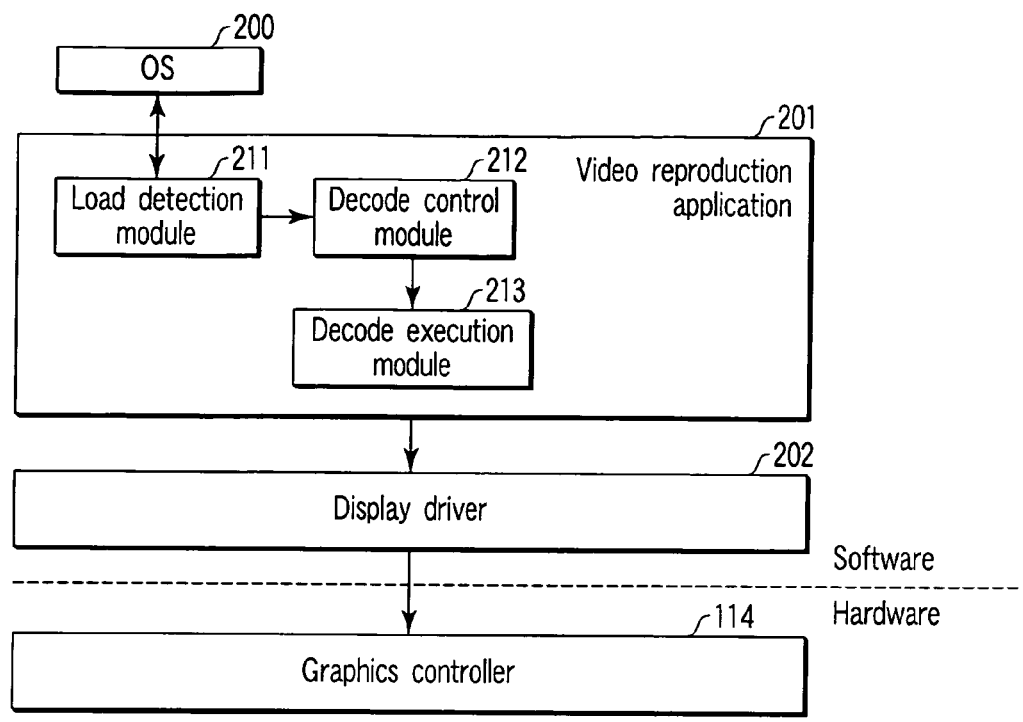
FIG. 3 is a block diagram showing a functional configuration of a video reproduction application program that is used in the computer shown in FIG. 1.

As is shown in FIG. 3, the video reproduction application program 201 includes a load detection module 211, a decode control module 212 and a decode execution module 213.

The decode execution module 213 is a decoder that executes a decoding process, which is defined by H.264/AVC standard. The load detection module 211 is a module that detects a load on the computer 10. For example, the load detection module 211 inquires of an operating system (OS) 200 about the current load on the computer 10, thereby detecting the current amount of load on the computer 10. The amount of load on the computer 10 is determined, for example, on the basis of the usage of CPU 111.

In addition, the amount of load on the computer 10 may be determined on the basis of the combination of the usage of CPU 111 and the usage of memory 113. Normally, in order to smoothly execute software decoding, a memory of a predetermined size or more is necessary. If the memory usage of the system increases, the decoding performance of the software decoder decreases due to the paging of the OS. By detecting the amount of load on the computer 10 on the basis of the combination of the usage of CPU 111 and the usage of memory 113, it becomes possible to exactly determine whether or not the current amount of load on the computer 10 is an amount of load that may cause a problem with the execution of the software decoder ("high load state").

The decode control module 212 controls the content of the decoding process that is executed by the decode execution module 213, in accordance with the load on the computer 10, which is detected by the load detection module 211.

Specifically, if the amount of load on the computer 10 is a predetermined reference value or less, the decode control module 212 controls the content of the decoding process, which is to be executed by the decode execution module 213, so that the decoding process that is defined by H.264/AVC standard may be executed by the CPU 111. On the other hand, if the amount of load on the computer 10 is greater than the reference value ("high load state"), the decode control module 212 controls the content of the decoding process, which is to be executed by the decode execution module 213, so that a part of the decoding process that is defined by H.264/AVC standard may be skipped or replaced with a simplified process.

Motion video data that is decoded by the video reproduction application program 201 is successively written in a video memory 114A of the graphics controller 114 via a display driver 202. Thereby, the decoded motion video data is displayed on the LCD 17. The display driver 202 is software for controlling the graphics controller 114.

In addition, the CPU 111 executes a system BIOS (Basic Input/Output System) that is stored in the BIOS-ROM 120. The system BIOS is a program for hardware control.

The north bridge 112 is a bridge device that connects a local bus of the CPU 111 and the south bridge 119. The north bridge 112 includes a memory controller that access-controls the main memory 113. The north bridge 112 has a function of executing communication with the graphics controller 114 via, e.g. an AGP (Accelerated Graphics Port) bus.

The graphics controller 114 is a display controller for controlling the LCD 17 that is used as a display monitor of the computer 10. The graphics controller 114 generates a video signal, which is to be sent to the LCD 17, on the basis of video data that is written in the video memory (VRAM) 114A.

The south bridge 119 controls the devices on an LPC (Low Pin Count) bus, and the devices on a PCI (Peripheral Component Interconnect) bus. In addition, the south bridge 119 includes an IDE (Integrated Drive Electronics) controller for controlling the HDD 121 and ODD 122. The south bridge 119 also includes a function of controlling the digital TV broadcast tuner 123 and a function for access-controlling the BIOS-ROM 120.

The HDD 121 is a storage device that stores various software and data. The optical disc drive (ODD) 123 is a drive unit for driving storage media, such as a DVD, on which video content is stored. The digital TV broadcast tuner 123 is a receiving device for receiving broadcast program data, such as digital TV broadcast program data, from outside.

The embedded controller/keyboard controller IC (EC/KBC) 124 is a 1-chip microcomputer in which an embedded controller for power management and a keyboard controller for controlling the keyboard (KB) 13 and touch pad 16 are integrated. The embedded controller/keyboard controller IC (EC/KBC) 124 has a function of powering on/off the computer 10 in response to the user's operation of the power button 14. Further, the embedded controller/keyboard controller IC (EC/KBC) 124 is capable of powering on/off the computer 10 in response to the user's operation of the TV activation button 15A or DVD activation button 15B. The network controller 125 is a communication device that executes communication with an external network such as the Internet.

Figure 4:
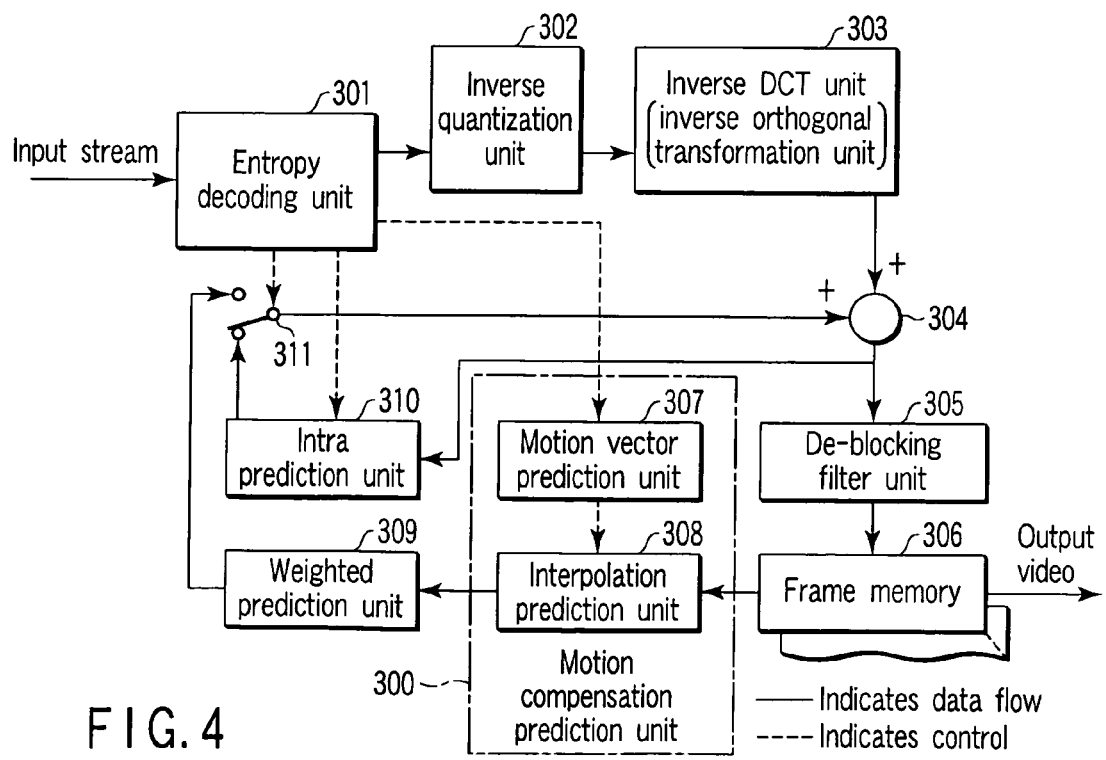
FIG. 4 is a block diagram showing the structure of a software decoder that is realized by the video reproduction application program shown in FIG. 3.

Next, referring to FIG. 4, a description is given of the functional configuration of the software decoder that is realized by the video reproduction application program 201.

The decode execution module 213 of the video reproduction application program 201 supports H.264/AVC standard. As is shown in FIG. 4, the decode execution module 213 includes an entropy decoding unit 301, an inverse quantization unit 302, an inverse orthogonal transformation unit 303 such as an inverse DCT (Discrete Cosine Transform) unit, an adder unit 304, a de-blocking filter unit 305, a frame memory 306, a motion vector prediction unit 307, an interpolation prediction unit 308, a weighted prediction unit 309, an intra prediction unit 310, and a mode change-over switch unit 311. The orthogonal transformation according to H.264 is executed with integer-precision, and differs from conventional DCT. However, the orthogonal transformation according to H.264 is treated as DCT in this embodiment.

Encoding of each picture is executed in a macro-block unit of, e.g. 16×16 pixels. For each macro-block, one of an intra-frame coding mode ("intra coding mode") and a motion compensation inter-frame prediction coding mode ("inter coding mode") is selected.

In the inter coding mode, motion of a to-be-coded picture, relative to an already coded picture, is estimated. Thereby, a motion compensation inter-frame prediction signal corresponding to the to-be-coded picture is generated in a predetermined shape unit such as a block. A residual signal, which is obtained by subtracting the motion compensation inter-frame prediction signal from the to-be-coded picture, that is, a prediction error signal, is encoded by orthogonal transformation (DCT), quantization and entropy coding. In the intra coding mode, a prediction signal of a to-be-coded picture is generated from the same picture as the to-be-coded picture, and the generated prediction signal is encoded by orthogonal transformation (DCT), quantization and entropy coding.

In order to further enhance the compression ratio, the codec corresponding to the H.264/AVC standard makes use of the following techniques:

(1) motion compensation with a higher pixel precision (¼ pixel precision) than in conventional MPEG, (2) intra-frame prediction (also called "intra prediction") for efficiently executing intra-frame coding, (3) de-blocking filter for reducing block distortion, (4) integer DCT of a 4×4 pixel unit, (5) multi-reference frame, which can use a plurality of pictures at given positions as reference pictures, and (6) weighted prediction.

The operation of the software decoder shown in FIG. 4 is described.

A motion video stream, which is compression-encoded according to H.264/AVC standard, is input to the entropy decoding unit 301. The compression-encoded motion video stream includes, as well as encoded video information, motion vector information that has been used in the motion compensation inter-frame prediction coding ("inter prediction coding"), intra-frame prediction information that has been used in the intra-frame prediction coding ("intra prediction coding"), and mode information indicative of a prediction mode (inter prediction coding/intra prediction coding).

The decoding process is executed in units of, e.g. a macro-block of 16×16 pixels. The entropy decoding unit 301 subjects the motion video stream to an entropy decoding process such as variable-length decoding, and separates, from the motion video stream, a quantization DCT coefficient, motion vector information (motion vector difference information), intra-frame prediction information and mode information. In this case, for example, each macro-block in the to-be-decoded picture is subjected to the entropy decoding process in units of a block of 4×4 pixels (or 8×8 pixels), and each block is transformed to 4×4 (or 8×8) quantization DCT coefficients. In the description below, it is assumed that each block comprises 4×4 pixels.

The motion vector information is sent to the motion vector prediction unit 307. The intra-frame prediction information is sent to the intra prediction unit 310. The mode information is sent to the mode change-over switch 311.

The 4×4 quantization DCT coefficients of each to-be-decoded block are transformed to 4×4 DCT coefficients (orthogonal transformation coefficients) by an inverse quantization process in the inverse quantization unit 302. The 4×4 DCT coefficients are transformed to 4×4 pixel values, from frequency information, by an inverse-integer DCT (inverse orthogonal transformation) process in the inverse DCT unit 303. The 4×4 pixel values are a prediction error signal corresponding to the to-be-decoded block. The prediction error signal is sent to the adder unit 304. The adder unit 304 adds the prediction error signal and a prediction signal corresponding to the to-be-decoded block (i.e. motion compensation inter-frame prediction signal or intra-frame prediction signal). Thus, the 4×4 pixel values corresponding to the to-be-decoded block are decoded.

In the intra prediction mode, the intra prediction unit 310 is selected by the mode change-over switch unit 311. Thereby, the intra-frame prediction signal, which is obtained by the intra prediction unit 310, is added to the prediction error signal. In the inter prediction mode, the weighted prediction unit 309 is selected by the mode change-over switch unit 311. Thereby, the motion compensation inter-frame prediction signal, which is obtained by the motion vector prediction unit 307, interpolation prediction unit 308 and weighted prediction unit 309, is added to the prediction error signal.

In this way, the process, which adds the prediction signal (motion compensation inter-frame prediction signal or intra-frame prediction signal) to the prediction error signal corresponding to the to-be-decoded picture and decodes the to-be-decoded picture, is executed in units of a predetermined block.

Each decoded picture is subjected to a de-blocking filter process in the de-blocking filter unit 305, and the resultant is stored in the frame memory 306. The de-blocking filter unit 305 executes the de-blocking filter process for reducing block distortion in each decoded picture, for example, in units of a block of 4×4 pixels. The de-blocking filter process prevents block distortion from being contained in the reference picture, and thus being propagated to decoded image of other pictures. The amount of processing for the de-blocking filter process is enormous, and in some cases it occupies 50% of the total processing amount of the software decoder. The de-blocking filter process is adaptively executed so that high-level filtering may be executed for a part at which block distortion tends to easily occur, and low-level filtering may be executed for a part at which block distortion tends to occur less easily. The de-blocking filter process is realized by a loop filter process.

Each picture that has been subjected to the de-blocking filter process is read out of the frame memory 306 as an output video frame (or an output video field). Each picture that is to be used as a reference picture for motion compensation inter-frame prediction is retained in the frame memory 306 for a predetermined time period. In the motion compensation inter-frame prediction coding according to H.264/AVC standard, a plurality of pictures can be used as reference pictures. Thus, the frame memory 306 includes a plurality of frame memory units for storing video of a plurality of pictures.

The motion vector prediction unit 307 and interpolation prediction unit 308 constitute a motion compensation prediction unit 300. The motion compensation prediction unit 300 executes a motion compensation prediction process for generating an inter-frame prediction signal, which corresponds to the to-be-decoded picture, from one or more reference pictures that have been referred by the to-be-decoded picture and have been subjected to the de-blocking filter process, on the basis of the motion vector information corresponding to the to-be-decoded picture. The motion compensation prediction process includes a process for subjecting the reference picture, which corresponds to the to-be-decoded picture, to a pixel interpolation process, and a process of generating an inter-frame prediction signal, which corresponds to the to-be-decoded picture, from the reference picture that has been subjected to the pixel interpolation process, based on the motion vector information included in the motion video stream. Specifically, the motion compensation prediction unit 300 subjects the decoded picture (reference picture corresponding to the to-be-decoded picture) to the pixel interpolation process, thereby generating a prediction interpolation signal including fractional-precision pixels. The motion compensation prediction unit 300 executes the motion compensation prediction on the basis of motion vector information, thereby generating the inter-frame prediction signal, which corresponds to the to-be-decoded picture, from the prediction interpolation signal obtained by the pixel interpolation process.

Next, the functions of the motion vector prediction unit 307 and interpolation prediction unit 308, which constitute the motion compensation prediction unit 300, are described.

The motion vector prediction unit 307 generates motion vector information corresponding to the to-be-decoded block, on the basis of motion vector difference information corresponding to the to-be-decoded block. The interpolation prediction unit 308 executes the above-described pixel interpolation process for the decoded picture (reference picture). Based on the motion vector information corresponding to the to-be-decoded block, the interpolation prediction unit 308 generates the motion compensation inter-frame prediction signal (also referred to as "inter-frame prediction signal") from pixels with integer precision and prediction interpolation pixels with ¼ pixel precision, which are included in the reference picture that has been subjected to the pixel interpolation process. A 6-tap filter (six inputs and one output) is used in order to generate the prediction interpolation pixels with ¼ pixel precision. Thus, a high-precision prediction interpolation process, in which frequency components up to high-frequency components are considered, can be executed, but a greater processing amount for motion compensation is required for that.

The weighted prediction unit 309 executes a process for multiplying the motion compensation inter-frame prediction signal by a weighting factor, in units of the motion compensation block. Thereby, a weighted motion compensation inter-frame prediction signal is generated. This weighted prediction is a process for predicting the brightness of the to-be-decoded picture. The weighted prediction process can enhance the quality of video with a brightness varying with time, as in the case of fade-in/fade-out. However, a processing amount necessary for software decoding increases for that.

The intra prediction unit 310 executes the intra-frame prediction process for generating the intra-frame prediction signal from the to-be-decoded picture. In the intra-frame prediction process, the intra-frame prediction signal, which corresponds to the to-be-decoded block included in the to-be-decoded picture, is generated from the to-be-decoded picture. The intra prediction unit 310 executes the intra-frame prediction process (also referred to as "intra prediction process") in accordance with the above-mentioned intra-frame prediction information, and generates the intra-frame prediction signal from pixel values in some other already decoded block that is located near the to-be-decoded block and is included in the same picture as the to-be-decoded block. This intra-frame prediction (intra prediction) is a technique for increasing the compression ratio by making use of a correlation of pixels between the blocks. In the intra-frame prediction, one of four prediction modes comprising vertical prediction (prediction mode 0), horizontal prediction (prediction mode 1), mean prediction (prediction mode 3) and plane prediction (prediction mode 4) is selected on the basis of the intra-frame information in units of the intra-frame prediction block (e.g. 16×16 pixels). The frequency of selection of the plane prediction is lower than that of selection of other intra-frame prediction modes, but the processing amount necessary for the plane prediction is greater than that necessary for any one of the other intra-frame prediction modes.

In the first embodiment, in order to realize real-time decoding of the motion video stream within the limited time period even if the load on the computer 10 increases, either the complete decoding process (hereinafter referred to as "normal decoding process") including the de-blocking filter process, as described with reference to FIG. 4, or a special decoding process is selectively executed in accordance with the load on the computer 10. In the special decoding process, only the de-blocking filter process is omitted from the normal decoding process. In the special decoding process, the de-blocking filter process is skipped. The motion compensation inter-frame prediction signal corresponding to the to-be-decoded picture is generated by using, as the reference picture, not the picture that has been subjected to the de-blocking filter process, but one or more decoded pictures that are not subjected to the de-blocking filter process.

Figure 5:
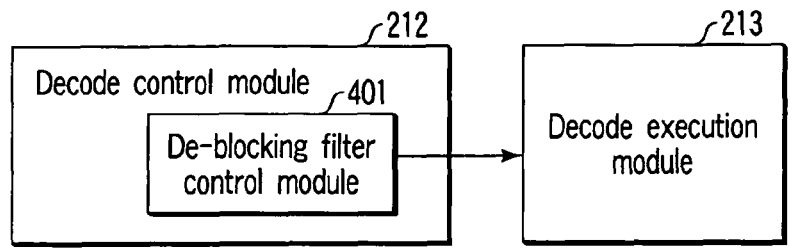
FIG. 5 shows the structure of a decode control module that is used in the computer shown in FIG. 1.

In order to realize the special decoding process, the decode control module 212, as shown in FIG. 5, includes a de-blocking filter control module 401. When the load on the computer 10 is greater than a predetermined reference value, the de-blocking filter control module 401 skips the execution of the de-blocking filter process, and executes the process for generating the inter-frame prediction signal, which corresponds to the to-be-decoded picture, from one or more decoded pictures (reference pictures) that are not subjected to the de-blocking filter process.

Figure 6:
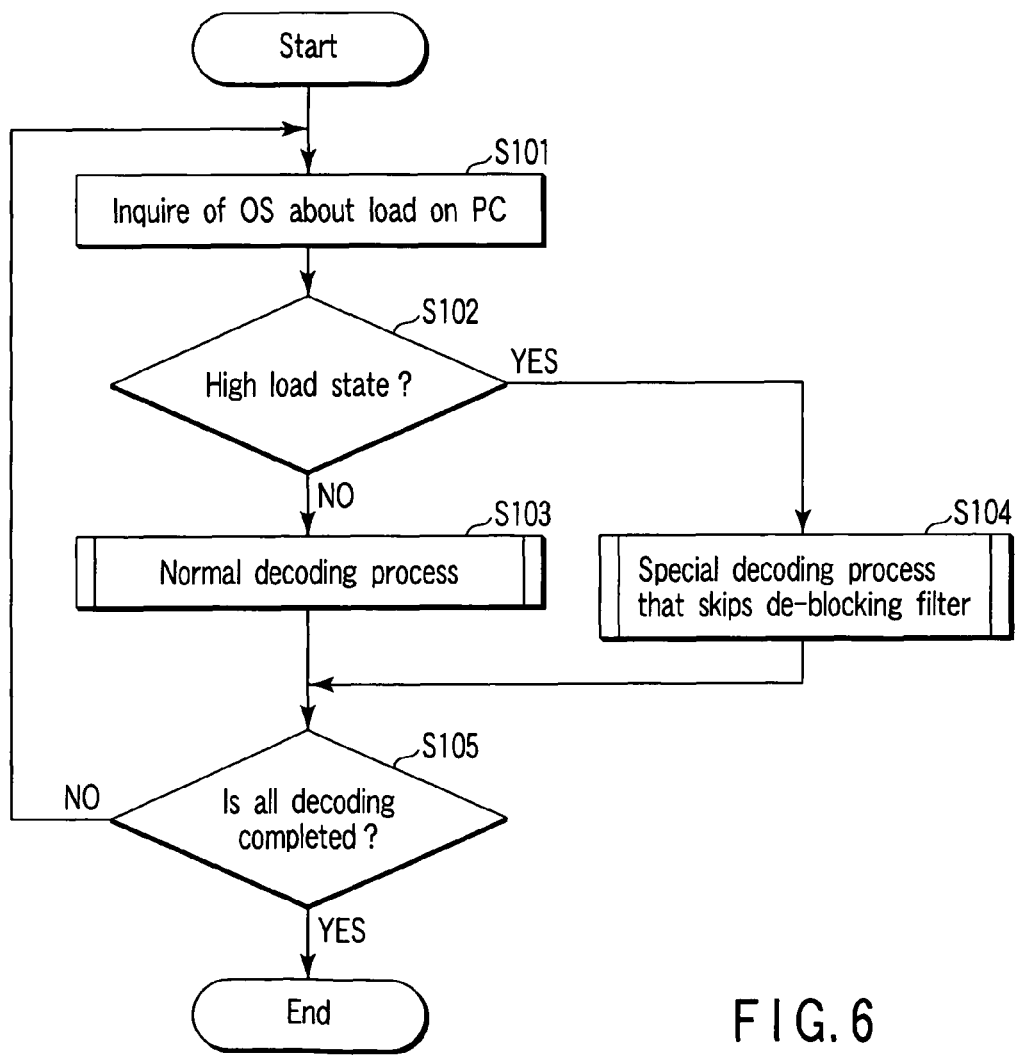
FIG. 6 is a flow chart illustrating the procedure of a decoding process that is executed by the video reproduction application program shown in FIG. 3.

Referring now to a flow chart of FIG. 6, an example of the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S101). In step S101, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S102). In step S102, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S102), the video reproduction application program 201 selects the above-mentioned normal decoding process as the decoding process to be executed by the CPU 111, and executes the above-described series of processes on the CPU 111, as described with reference to FIG. 4 (step S103). Unless the computer 10 goes into the high load state, that is, unless the decoding performance decreases, the motion video stream is decoded by the normal decoding process.

On the other hand, if the computer 10 is in the high load state (YES in step S102), the video reproduction application program 201 selects the above-described special decoding process, and executes, on the CPU 111, the process from which the de-blocking filter process in the series of processes described with reference to FIG. 4 is excluded (step S104). In this case, a decoded picture that is not subjected to the de-blocking filter process is stored in the frame memory 306. Thus, the motion compensation inter-frame prediction signal corresponding to the to-be-decoded picture is generated from one or more decoded pictures that are not subjected to the de-blocking filter process.

By skipping the execution of the de-blocking filter process, it is possible that video including block distortion is output. However, the processing amount necessary for software decoding of 1 picture is remarkably decreased. Hence, even if some other program is executed during the execution of the software decoding and the computer 10 transits to the high load state, it is possible to prevent such problems as frame dropping or extreme slowness in motion of objects. Therefore, it is possible to smoothly and continuously execute decoding and reproduction of motion video data.

Until the motion video stream is completely decoded, the above-described process of steps S101 to S104 is repeated (step S105). If the execution of the other program is finished and the load on the computer 10 decreases, the decoding process is switched from the special decoding process back to the normal decoding process.

As has been described above, according to the first embodiment, when the system is in the high load state, the load on the system is decreased by skipping the de-blocking filter process that requires a great amount of processing. Thereby, smooth motion video reproduction is realized without such problems as frame dropping or extreme slowness in motion of objects.

The above-described decode control process is entirely realized by the computer program. Thus, only by installing the computer program in an ordinary computer via a computer-readable memory medium, can the same advantage as with the first embodiment easily be attained.

Second Embodiment

Next, referring to FIG. 7 to FIG. 10, a computer 10 according to a second embodiment of the invention is described.

A description is given of only parts that are different from the parts of the first embodiment, and a description of the common parts to the first embodiment is omitted.

In the second embodiment, in order to realize real-time decoding of the motion video stream within the limited time period even if the load on the computer 10 increases, either the decoding process (normal decoding process) as described with reference to FIG. 4, or a special decoding process is selectively executed in accordance with the load on the computer 10. In the second embodiment, the special decoding process is a process in which the content of the pixel interpolation process is simplified or omitted. In the description below, this special decoding process is referred to as "special interpolation prediction decoding process".

Figure 7:
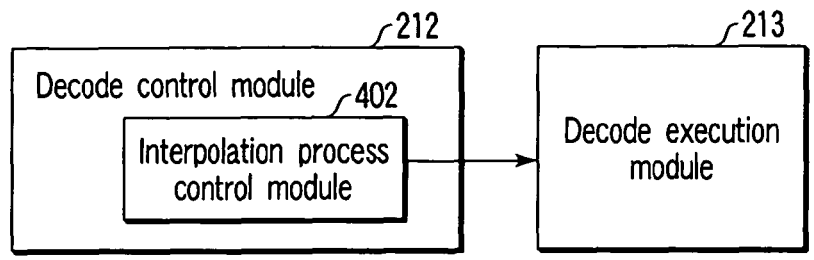
FIG. 7 shows the structure of a decode control module that is used in a computer according to a second embodiment of the invention.

In order to realize the special interpolation prediction decoding process, the decode control module 212 includes an interpolation process control module 402, as shown in FIG. 7. In the case where the load on the computer 10 is greater than a predetermined reference value, the interpolation process control module 402 alters the content of the pixel interpolation process so as to reduce the load on the computer 10.

Figure 8:
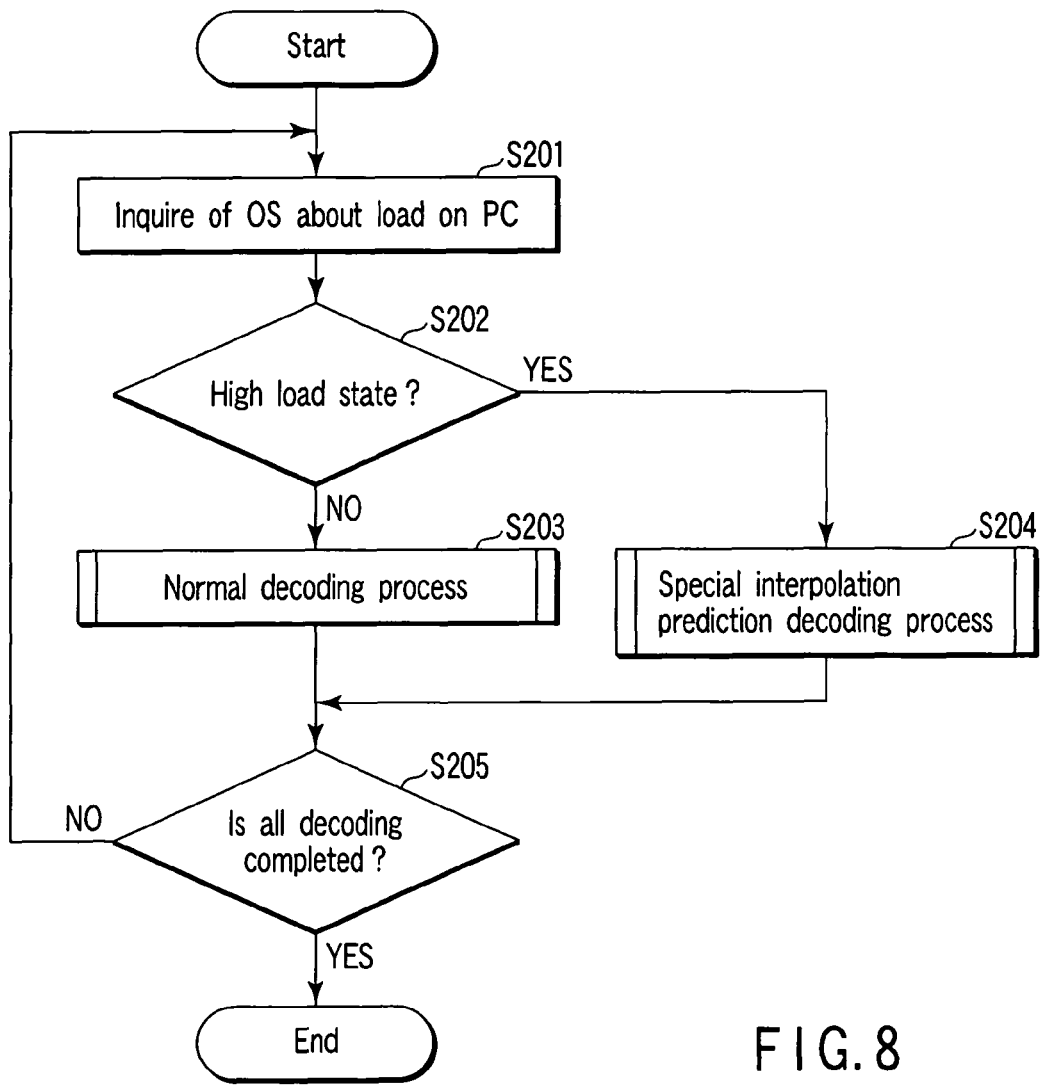
FIG. 8 is a flow chart illustrating the procedure of a decoding process that is executed by a video reproduction application program for use in the computer according to the second embodiment.

Referring now to a flow chart of FIG. 8, a description is given of an example of the procedure of the decoding process that is executed by the video reproduction application program 201, which runs on the computer 10 according to the second embodiment.

While the decoding process is being executed, the video reproduction application program 201 periodically repeats the process for detecting current load on the computer 10 by inquiring of the OS about the current load of computer 10 (step S201). In step S201, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S202). In step S202, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S202), the video reproduction application program 201 selects the above-mentioned normal decoding process as the decoding process to be executed by the CPU 111, and executes the above-described series of processes on the CPU 111, as described with reference to FIG. 4 (step S203).

Figure 9:
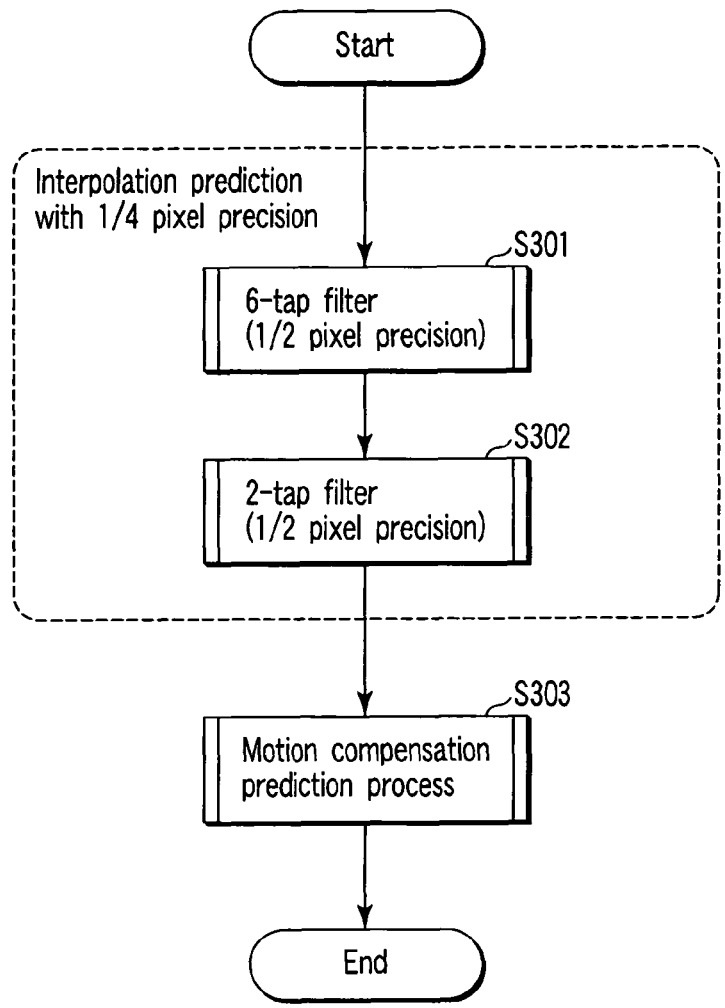
FIG. 9 is a flow chart illustrating an example of a first interpolation prediction process that is executed by the video reproduction application program according to the second embodiment.

As is shown in FIG. 9, in the normal decoding process, the interpolation prediction unit 308 generates prediction interpolation pixels with ½ pixel precision (½ pixel signal) from the reference picture corresponding to the to-be-decoded picture, using a 6-tap filter (six inputs and one output) (step S301). After ½ pixel signals corresponding to all pixel positions with ½ pixel precision are generated, the interpolation prediction unit 308 generates prediction interpolation pixels with ¼ pixel precision (¼ pixel signal) using a 2-tap mean filter (two inputs and one output) (step S302). After all ¼ pixel signals corresponding to all pixel positions with ¼ pixel precision are generated, the interpolation prediction unit 308 executes the motion compensation prediction process using the generated ¼ pixel signals, thereby generating a motion compensation prediction signal (step S303).

Unless the computer 10 goes into the high load state, that is, unless the decoding performance decreases, the motion video stream is decoded by the normal decoding process.

On the other hand, if the computer 10 is in the high load state (YES in step S202 in FIG. 8), the video reproduction application program 201 selects the above-described special interpolation prediction decoding process as the decoding process to be executed by the CPU 111, and executes the process, in which the processing relating to the interpolation prediction is simplified or omitted, on the CPU 111 (step S204).

Pixel interpolation processes, which are executed in the special interpolation prediction decoding process, are classified into the following three:

(a) Interpolation with ¼ pixel precision is replaced with interpolation with ½ pixel precision.

(b) A 6-tap filter is replaced with a 2-tap filter.

(c) No filter is used (i.e. integer pixel precision).

Figure 10:
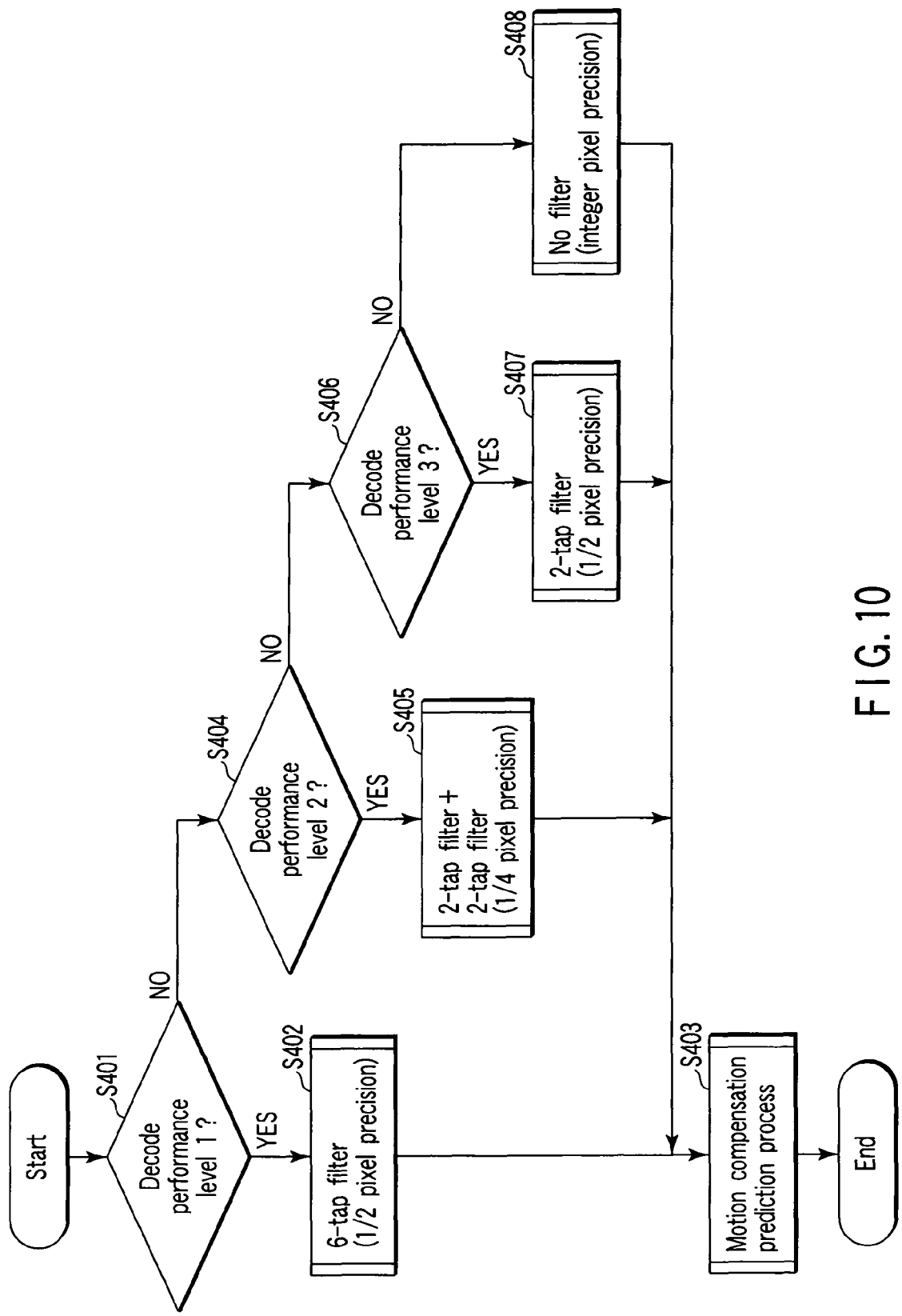
FIG. 10 is a flow chart illustrating an example of a second interpolation prediction process that is executed by the video reproduction application program according to the second embodiment.

In the second embodiment, if the computer 10 is in the high load state, one of the above processes (a), (b) and (c) is selectively executed in accordance with the current load amount of the computer 10, as shown in FIG. 10. The high load state is classified into decode performance levels 1, 2 and 3. The load on the computer becomes higher in the order of levels 1, 2 and 3.

If the current load corresponds to decode performance level 1 (YES in step S401), the interpolation prediction unit 308 selects the above method (a) and executes the process of generating ½ pixel signals using the 6-tap filter (step S402). Then, the interpolation prediction unit 308 executes the motion compensation prediction process using the ½ pixel signals (step S403).

If the current load amount corresponds to decode performance level 2 (YES in step S404), the interpolation prediction unit 308 selects the above method (b), generates ½ pixel signals using the 2-tap filter, and then generates ¼ pixel signals using the 2-tap filter (step S405). Subsequently, the interpolation prediction unit 308 executes the motion compensation prediction process using the ¼ pixel signals (step S403).

If the current load corresponds to decode performance level 3 (YES in step S406), the interpolation prediction unit 308 selects both the above methods (a) and (b), and generates ½ pixel signals using the 2-tap filter (step S407). Subsequently, the interpolation prediction unit 308 executes the motion compensation prediction process using the ½ pixel signals (step S403).

If the current load is higher than decode performance level 3 (NO in step S406), the interpolation prediction unit 308 selects the above method (c) and skips the pixel interpolation process (step S408). In this case, the interpolation prediction unit 308 executes the motion compensation prediction process using the reference picture that is not subjected to the pixel interpolation process, that is, the integer pixel signal (step S403).

As has been described above, by simplifying the content of the pixel interpolation process or skipping the execution of the pixel interpolation process, it becomes possible to reduce the processing amount necessary for software decoding of 1 picture. Hence, even if some other program is executed during the execution of the software decoding and the computer 10 transits to the high load state, it is possible to prevent such problems as frame dropping or extreme slowness in motion of objects. Therefore, it is possible to smoothly and continuously execute decoding and reproduction of motion video data.

If the content of the pixel interpolation process is simplified or skipped, the precision in motion compensation may possibly decrease. However, compared to occurrence of frame dropping or extreme slowness in motion of objects, motion video with sufficiently high visibility can be displayed.

Until the motion video stream is completely decoded, the above-described process of steps S201 to S204 in FIG. 8 is repeated (step S205). If the execution of the other program is finished and the load on the computer 10 decreases, the decoding process is switched from the special interpolation prediction decoding process back to the normal decoding process.

As has been described above, according to the second embodiment, it is possible to execute automatic switching between motion video reproduction with priority on image quality and motion video reproduction with priority on smoothness rather than the image quality, in accordance with the load on the computer 10. Specifically, if the system is in the low load state, motion video with high quality can be displayed by executing the normal decoding process. When the system is in the high load state, the load on the system is decreased by altering the content of the pixel interpolation process that requires a great amount of processing. Thereby, smooth motion video reproduction is realized without such problems as frame dropping or extreme slowness in motion of objects.

The above-described decode control process is entirely realized by the computer program. Thus, only by installing the computer program in an ordinary computer via a computer-readable memory medium, can the same advantage as with the present second embodiment easily be attained.

Third Embodiment

Next, referring to FIG. 11 to FIG. 20, a computer 10 according to a third embodiment of the invention is described.

A description is given of only parts that are different from the parts of the first embodiment, and a description of the common parts to the first embodiment is omitted.

In the third embodiment, in order to realize real-time decoding of the motion video stream within the limited time period even if the load on the computer 10 increases, either the decoding process (normal decoding process) as described with reference to FIG. 4, or a special decoding process is selectively executed in accordance with the load on the computer 10. In the third embodiment, the special decoding process is a decoding process in which the decoding (the entire process after the entropy decoding process in FIG. 4) for a non-reference picture that is not referred to by other encoded pictures is skipped and only a reference picture that is referred to by other pictures is decoded.

Figure 11:
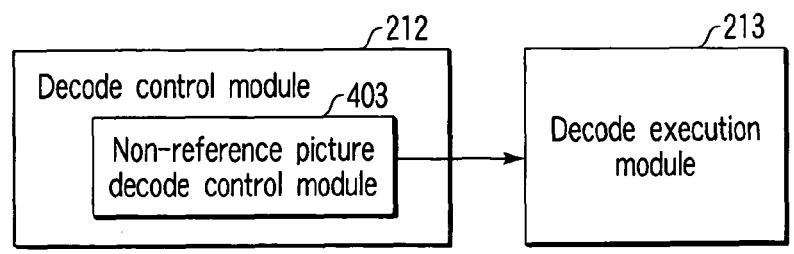
FIG. 11 shows the structure of a decode control module that is used in a computer according to a third embodiment of the invention.

In order to realize the special interpolation prediction decoding process, the decode control module 212 includes a non-reference picture decode control module 403, as shown in FIG. 11. When the load on the computer 10 is greater than a predetermined reference value, the non-reference picture decode control module 403 detects a non-reference picture, which is not referred to by other encoded pictures, from encoded pictures included in the motion video stream, on the basis of syntax information included in the motion video stream. The non-reference picture decode control module 403 skips execution of the decoding process for each of the detected non-reference pictures.

Figure 12:
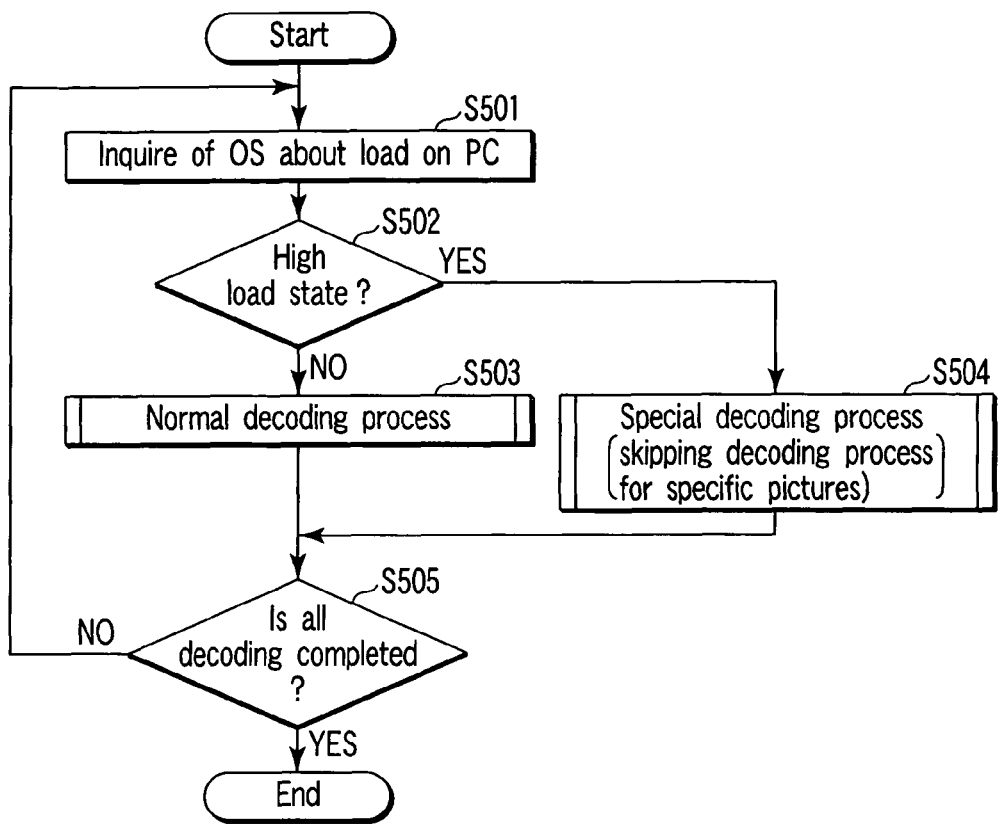
FIG. 12 is a flow chart illustrating the procedure of a decoding process that is executed by a video reproduction application program for use in the third embodiment.

Referring now to a flow chart of FIG. 12, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S501). In step S501, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S502). In step S502, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S502), the video reproduction application program 201 selects the above-mentioned normal decoding process as the decoding process to be executed by the CPU 111, and executes the above-described series of processes on the CPU 111, as described with reference to FIG. 4 (step S503).

In the normal decoding process, each of decoded pictures that are included in the compression-encoded motion video stream is decoded in succession. Unless the computer 10 goes into the high load state, that is, unless the decoding performance decreases, the motion video stream is decoded by the normal decoding process.

On the other hand, if the computer 10 is in the high load state (YES in step S502), the video reproduction application program 201 selects the above-described special decoding process as the decoding process to be executed by the CPU 111, and executes on the CPU 111 the process in which the decoding of non-reference pictures is omitted (step S504). In the special decoding process, the video reproduction application program 201 analyzes syntax information that is included in the motion video stream, and determines whether the to-be-decoded picture is a non-reference picture or not. If the to-be-decoded picture is a non-reference picture, the video reproduction application program 201 skips the decoding process for the to-be-decoded picture. The syntax information is indicative of the sequence structure of the motion video stream. The above-mentioned motion vector information, intra-frame information and mode information is part of the syntax information. Based on the entropy-decoded syntax information, the video reproduction application program 201 detects non-reference pictures from among the encoded pictures that are included in the motion video stream.

By skipping the decoding process for each non-reference picture, the amount of processing necessary for the software decoding can greatly be reduced. Even if the decoding process for the non-reference pictures is skipped, no problem will arise with the decoding of other pictures. Thus, even if some other program is executed during the execution of the software decoding and the computer 10 transits to the high load state, it is possible to prevent such problems as frame dropping or extreme slowness in motion of objects. Therefore, it is possible to smoothly and continuously execute decoding and reproduction of motion video data.

Until the motion video stream is completely decoded, the above-described process of steps S501 to S504 is repeated (step S505). If the execution of the other program is finished and the load on the computer 10 decreases, the decoding process is switched from the special decoding process back to the normal decoding process.

Figure 13:
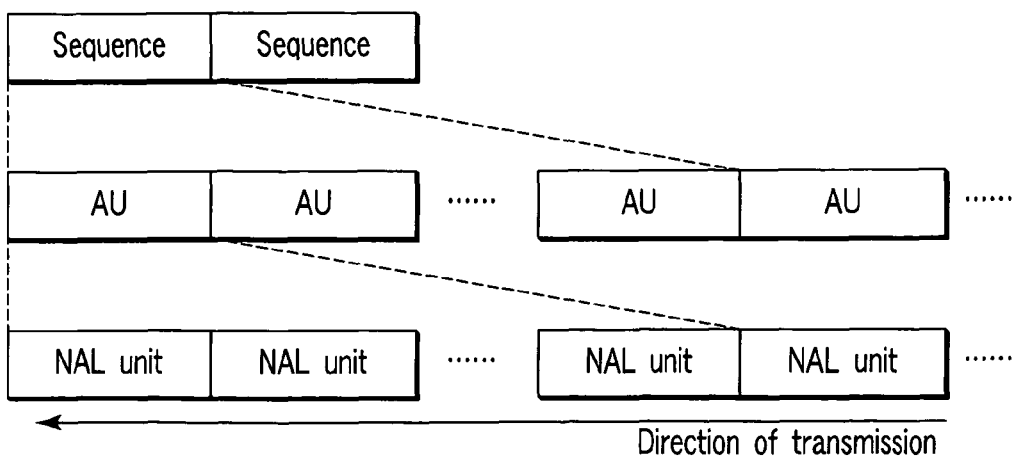
FIG. 13 shows the structure of a motion video stream that is decoded by the video reproduction application program according to the third embodiment.

As is shown in FIG. 13, the sequence structure according to H.264 standard comprises a plurality of access units (AU). One access unit corresponds to one picture. Each access unit comprises a plurality of NAL (Network Abstraction Layer) units. As is shown in FIG. 14, each NAL unit includes a header part and a data part. As is shown in FIG. 18, there are 32 kinds of NAL units. By analyzing the header part of the NAL unit, the kind of the NAL unit can be identified. FIG. 15 shows the structure of the AU shown in FIG. 13, wherein specific kinds of NAL units are designated. In FIG. 15, the respective blocks included in the access unit are NAL units.

Figure 16:
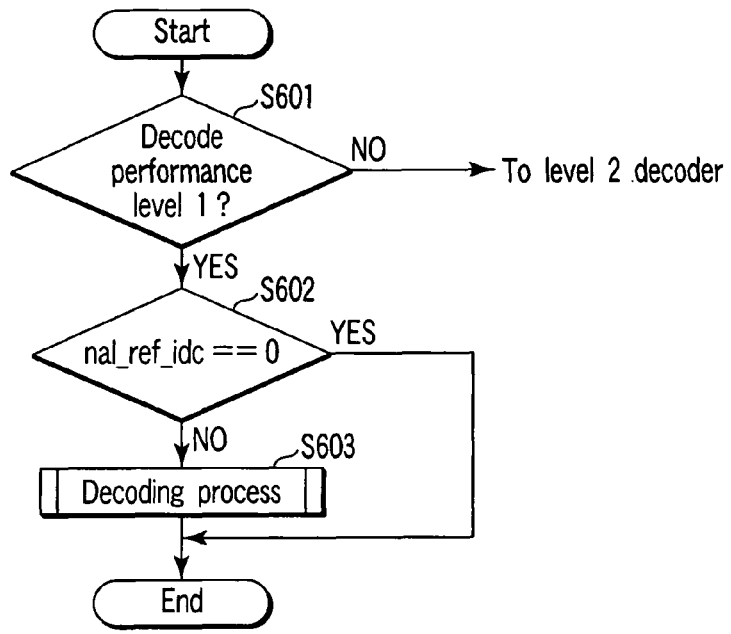
FIG. 16 is a flow chart illustrating an example of a first special decoding process that is executed by the video reproduction application program according to the third embodiment.
Figure 17:
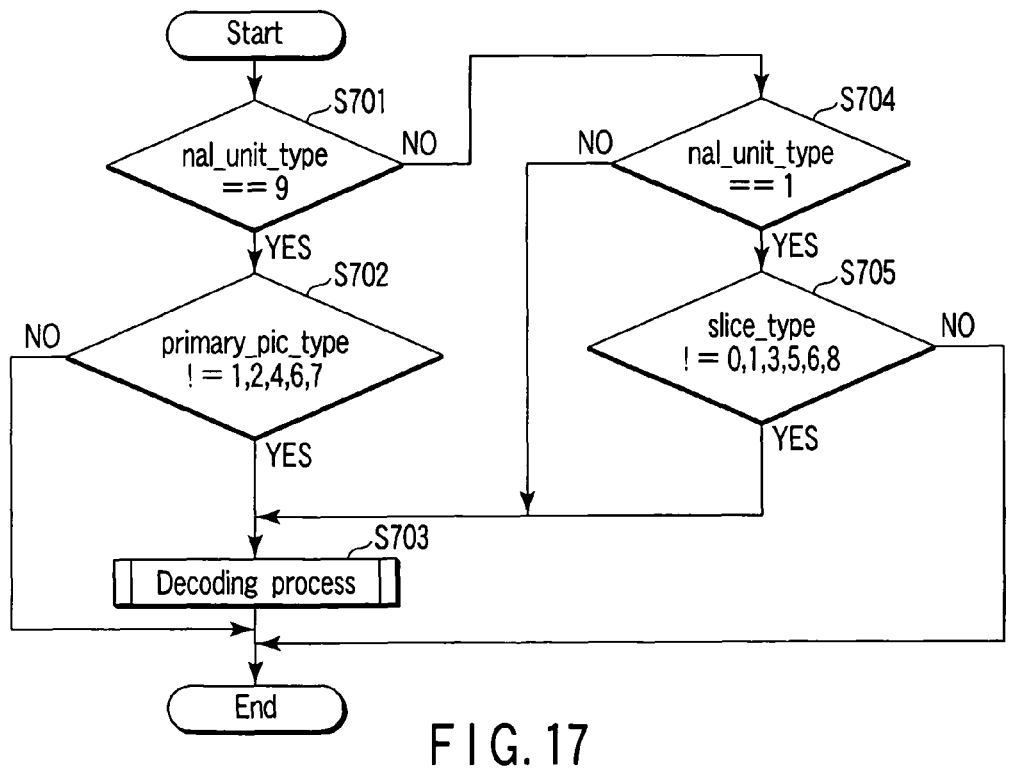
FIG. 17 is a flow chart illustrating an example of a second special decoding process that is executed by the video reproduction application program according to the third embodiment.

Referring now to FIG. 16 and FIG. 17, a specific procedure of the special decoding process is described.

In the third embodiment, the high load state is classified into decode performance levels 1 and 2. The decode performance level 2 indicates a higher current load on the computer 10 than the decode performance level 1.

If the current load amount corresponds to the decode performance level 1 (YES in step S601 in FIG. 16), the video reproduction application program 201 refers to nal_ref_idc, which is included in the header part of the NAL unit shown in FIG. 14, and determines whether the current to-be-decoded picture is a non-reference picture (step S602). If nal_ref_idc=0, this means that the current to-be-decoded picture is not a reference picture. Thus, if nal_ref_idc=0, the video reproduction application program 201 skips the decoding process in step S603 and finishes the decoding process for the to-be-decoded picture. For the to-be-decoded picture that does not meet "nal_ref_idc=0," the decoding process in step S603 is executed as in the normal case.

If the current load amount corresponds to the decode performance level 2, that is, if the current load amount exceeds the reference value that corresponds to the decode performance level 2, the special decoding process as illustrated in FIG. 17 is executed. In this case, the decoding process for pictures (P pictures, B pictures) that have been subjected to the motion compensation inter-frame prediction encoding is omitted, and only pictures (I pictures) that have been subjected to the intra-frame encoding are decoded.

To begin with, the video reproduction application program 201 refers to nal_unit_type, which is included in the NAL header of the to-be-decoded picture, and determines whether nal_unit_type=9 (step S701). For example, if the encoded data according to H.264/AVC standard is applied to an MPEG2 system, the motion video stream includes a NAL unit having AU delimiter information. If nal_unit_type=9 (YES in step S701), the video reproduction application program 201 refers to primary_pic_type in the AU delimiter information, and determines whether the primary_pic_type of the to-be-decoded picture is other than 1, 2, 4, 6 and 7 (step S702).

As is shown in FIG. 19, the numbers of primary_pic_type designate the kinds of slices included in the encoded picture. If the number of primary_pic_type is any one of 1, 2, 4, 6 and 7, the encoded picture includes a P (Predictive) slice or a B (Bi-predictive) slice. Thus, if the primary_pic_type of the to-be-decoded picture is any one of 1, 2, 4, 6 and 7 (NO in step S702), the decoding process in step S703 is skipped and the decoding process for the to-be-decoded picture is finished. On the other hand, if the primary_pic_type of the to-be-decoded picture is any one of 0, 3 and 5 (YES in step S702), the video reproduction application program 201 executes the decoding process in step S703.

Figure 20:
FIG. 20 is a table showing the relationship between slice types and the kinds of slices, which are included in the motion video stream shown in FIG. 13.

If the AU delimiter is not included in the motion video stream (NO in step S701), the video reproduction application program 201 refers to nal_unit_type in the NAL header of the to-be-decoded picture, and determines whether the to-be-decoded picture is a picture other than IDR (Instantaneous Decoding Refresh) picture (step S704). The IDR picture is a picture including an I (Intra) slice. If the to-be-decoded picture is the IDR picture (NO in step S704), the video reproduction application program 201 executes the decoding process in step S703. If the to-be-decoded picture is a picture other than IDR picture (YES in step S704), the video reproduction application program 201 refers to slice_type in the slice header of the to-be-decoded picture, and determines whether all of "slice_type" included in the to-be-decoded picture are other than 0, 1, 3, 5, 6 and 8 (step S705). As is shown in FIG. 20, the number of slice_type designates the kind of slice. If all of "slice_type" are any one of 0, 1, 3, 5, 6 and 8 (NO in step S705), the video reproduction application program 201 skips the decoding process in step S703.

The I (intra) picture does not refer to other pictures. Thus, even if the decoding P pictures and B pictures is skipped, the I picture can normally be decoded.

As has been described above, according to the third embodiment, if the decode performance level is 1, the decoding of non-reference pictures is omitted. If the decode performance level is 2, the decoding of P pictures and B pictures is omitted. Thereby, smooth motion video reproduction is realized without such problems as frame dropping or extreme slowness in motion of objects.

The decode control process according to the third embodiment is entirely realized by the computer program. Thus, only by installing the computer program in an ordinary computer via a computer-readable memory medium, can the same advantage as with the third embodiment easily be attained.

Fourth Embodiment

Figure 21:
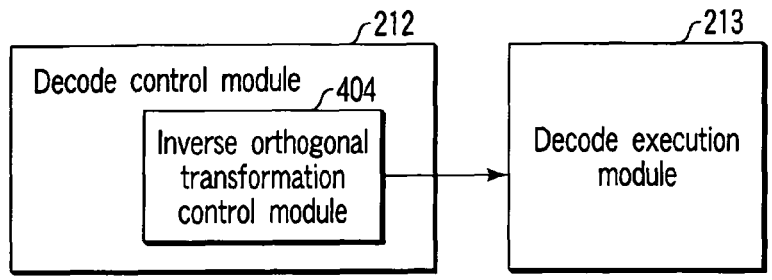
FIG. 21 shows the structure of a decode control module that is used in a computer according to a fourth embodiment of the invention.
Figure 22:
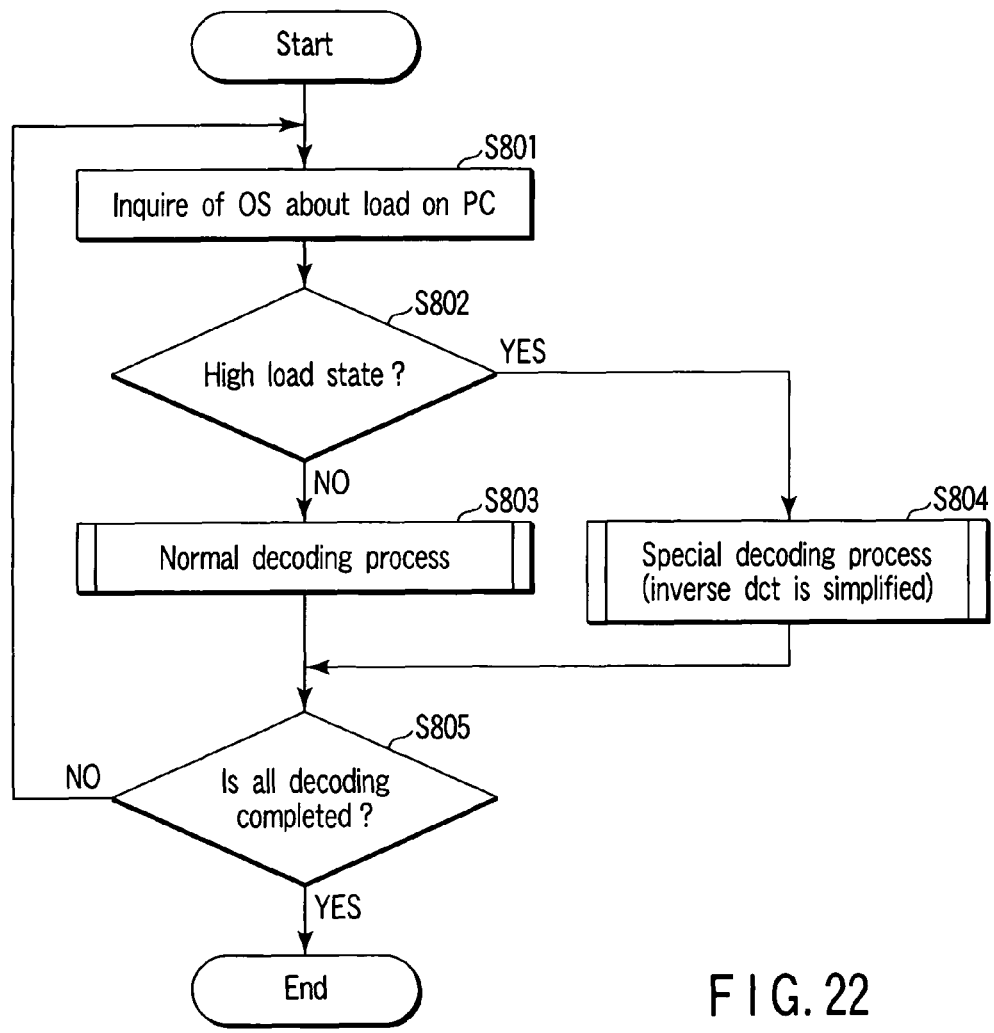
FIG. 22 is a flow chart illustrating the procedure of a decoding process that is executed by a video reproduction application program for use in the fourth embodiment.
Figure 23:
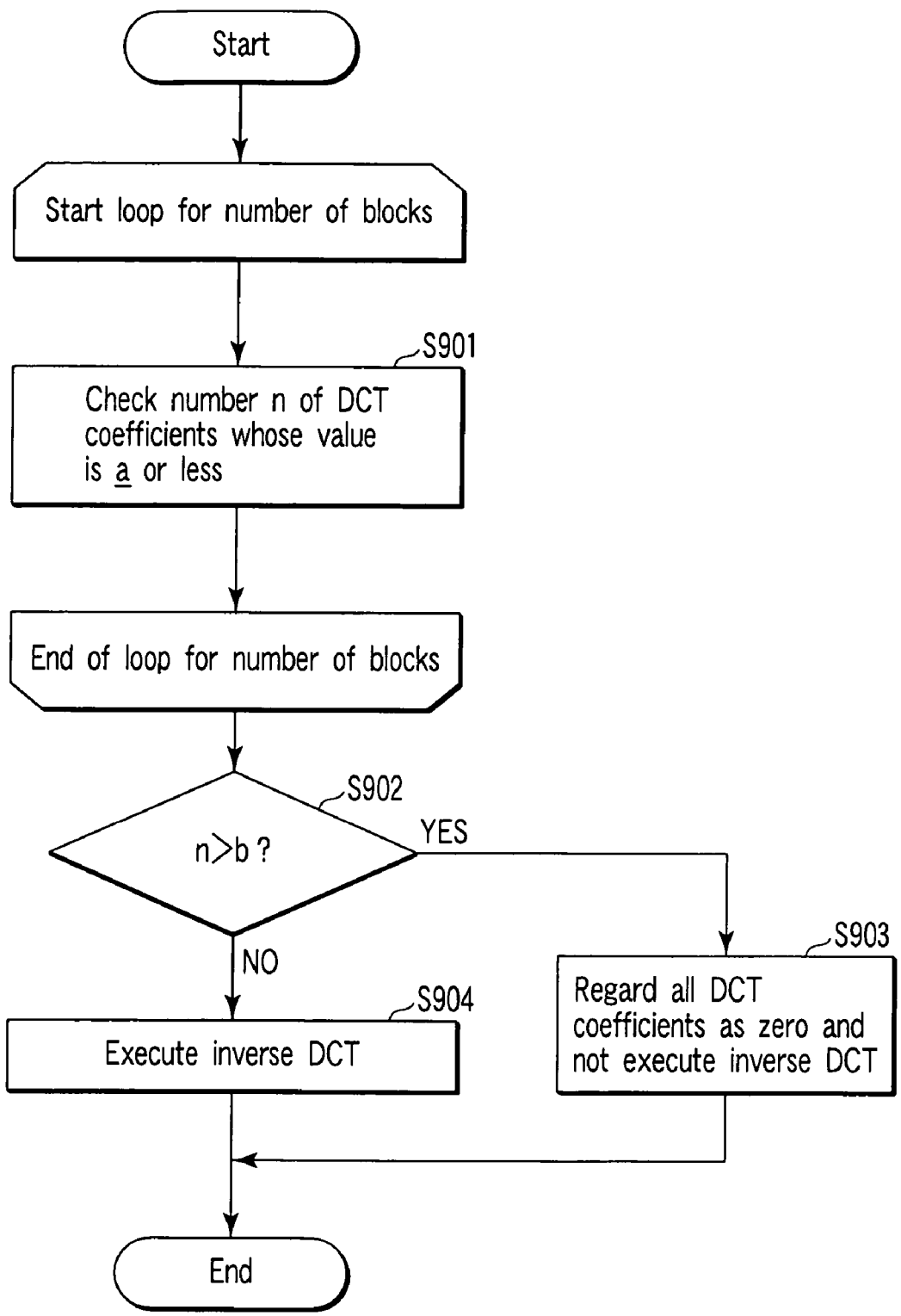
FIG. 23 is a flow chart illustrating the procedure of an inverse DCT control process that is executed by the video reproduction application program according to the fourth embodiment.

Next, referring to FIG. 21 to FIG. 23, a computer 10 according to a fourth embodiment of the invention is described.

A description is given of only parts that are different from the parts of the first embodiment, and a description of the common parts to the first embodiment is omitted.

In the fourth embodiment, in order to realize real-time decoding of the motion video stream within the limited time period even if the load on the computer 10 increases, either the decoding process (normal decoding process) as described with reference to FIG. 4, or a special decoding process is selectively executed in accordance with the load on the computer 10. In the fourth embodiment, the special decoding process is a decoding process in which execution of the inverse orthogonal transformation process (inverse DCT process) is simplified. In the special decoding process, on the basis of the values of orthogonal transformation coefficients (DCT coefficients) included in each of a plurality of blocks that form a to-be-decoded picture, a block, whose prediction error component is smaller than a predetermined value, is detected from the plural blocks that form the to-be-decoded picture, and execution of the inverse orthogonal transformation process (inverse DCT process) for the detected block is skipped. A prediction error signal corresponding to the block, for which the inverse orthogonal transformation process is skipped, is treated as zero. As a result, this block is decoded on the basis of only the prediction signal (motion compensation inter-frame prediction signal or intra-frame prediction signal).

In order to realize the special decoding process, the decode control module 212, as shown in FIG. 21, includes a inverse orthogonal transformation control module 404. When the load on the computer 10 is greater than a predetermined reference value, the inverse orthogonal transformation control module 404 executes an inverse orthogonal transformation control process. The inverse orthogonal transformation control process includes a process of detecting a block, whose prediction error component is less than a predetermined value, from a plurality of blocks that form the to-be-decoded picture, on the basis of values of orthogonal transformation coefficients included in each of the plurality of blocks that form the to-be-decoded picture, and a process of skipping execution of the inverse orthogonal transformation process for the detected block and setting the prediction error signal for the detected block at zero.

Referring now to a flow chart of FIG. 22, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S801). In step S801, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S802). In step S802, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S802), the video reproduction application program 201 selects the above-mentioned normal decoding process as the decoding process to be executed by the CPU 111, and executes the above-described series of processes on the CPU 111, as described with reference to FIG. 4 (step S803). Unless the computer 10 transits to the high load state, that is, unless the decoding performance decreases, the motion video stream is decoded by the normal decoding process.

On the other hand, if the computer 10 is in the high load state (YES in step S802), the video reproduction application program 201 selects the above-described special decoding process as the decoding process to be executed by the CPU 111, and executes on the CPU 111 the process in which the execution of the inverse DCT process for the block whose prediction error component is less than the predetermined value is skipped (step S804). In this case, a prediction error signal corresponding to the block, for which the inverse orthogonal transformation process is skipped, is treated as zero, and this block is decoded on the basis of only the prediction signal.

By skipping the execution of the inverse DCT process for the specific block, the amount of processing necessary for the software decoding of 1 picture can greatly be reduced. Thus, even if some other program is executed during the execution of the software decoding and the computer 10 transits to the high load state, it is possible to prevent such problems as frame dropping or extreme slowness in motion of objects. Therefore, it is possible to smoothly and continuously execute decoding and reproduction of motion video data. In addition, since the execution of the inverse DCT process is skipped for only the block whose prediction error component is small, the image quality does not considerably deteriorate due to the skipping of the inverse DCT process.

Until the motion video stream is completely decoded, the above-described process of steps S801 to S804 is repeated (step S805). If the execution of the other program is finished and the load on the computer 10 decreases, the decoding process is switched from the special decoding process back to the normal decoding process.

Referring now to a flow chart of FIG. 23, the inverse DCT control process that is executed in the special decoding process is explained.

In a case where the number of DCT coefficients with values close to zero, which are included in an inverse-quantized block, is greater than a certain value, the video reproduction application program 201 determines that a prediction error component of this block is less than a predetermined value. Specifically, the video reproduction application program 201 counts a number n of DCT coefficients with values, which are smaller than a constant a, with respect to each of the blocks (step S901). If a block whose number n is greater than a certain constant b is detected (YES in step S902), the video reproduction application program 201 regards all DCT coefficients in this block are zero, and does not execute the inverse DCT process (step S903). In this case, the video reproduction application program 201 treats the pixel value, i.e. the prediction error signal, of the block as being zero, and generates decoded video of this block on the basis of the prediction signal alone.

On the other hand, if a block whose number n is not greater than the certain constant b is detected (NO in step S902), the video reproduction application program 201 executes the inverse DCT process for the block (step S904). This block is decoded according to the same procedure as the normal decoding process.

As has been described above, according to the fourth embodiment, if the system is in the high load state, the inverse orthogonal transformation process for the specific block is skipped and the load on the system is decreased. Thereby, smooth motion video reproduction is realized without such problems as frame dropping or extreme slowness in motion of objects.

The decode control process according to the fourth embodiment is entirely realized by the computer program. Thus, only by installing the computer program in an ordinary computer via a computer-readable memory medium, can the same advantage as with the fourth embodiment easily be attained.

Fifth Embodiment

Next, referring to FIG. 24 to FIG. 27, a computer 10 according to a fifth embodiment of the invention is described.

A description is given of only parts that are different from the parts of the first embodiment, and a description of the common parts to the first embodiment is omitted.

Figure 25:
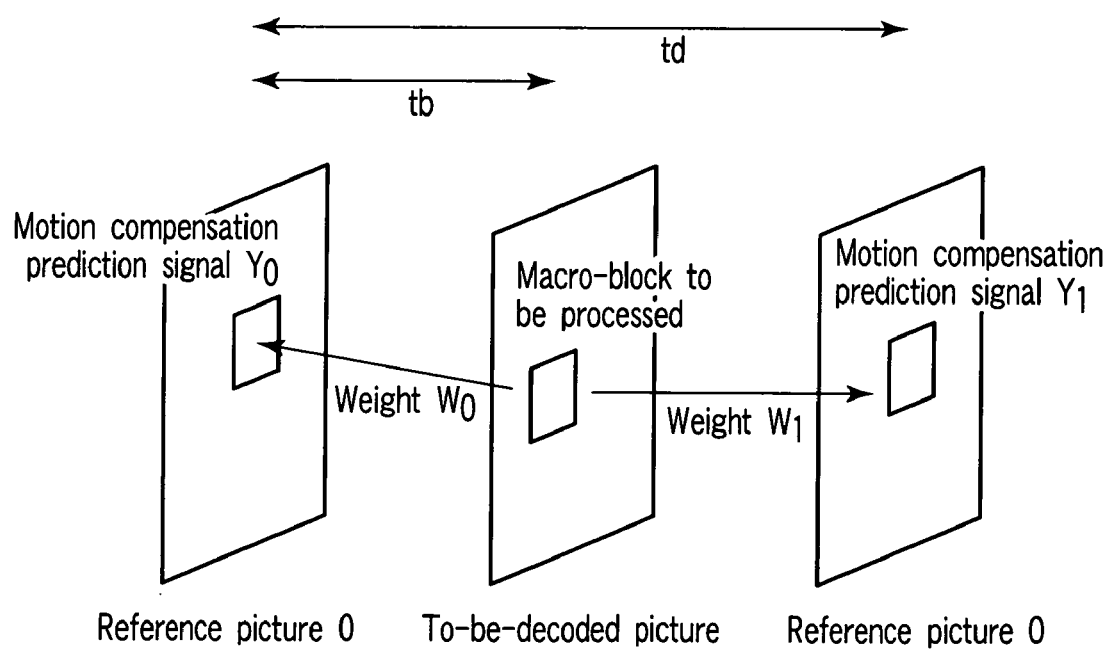
FIG. 25 is a view for explaining weighted prediction that is executed by a video reproduction application program for use in the fifth embodiment.

In the fifth embodiment, the weighted prediction process is selectively executed in accordance with the load on the computer 10. FIG. 25 illustrates an example of the weighted prediction that is executed by the weighted prediction unit 309 shown in FIG. 4.

FIG. 25 shows a case where two pictures are used as reference pictures for a to-be-decoded macro-block. A weighted prediction signal is generated by adaptively multiplying a motion compensation prediction signal $Y_0, Y_1$ by a weighting factor $W_0, W_1$. The weighted prediction is executed as follows. Assume now that a motion compensation prediction signal, which is obtained from a reference picture that is used for one prediction (L0 prediction), is an L0 motion compensation prediction signal, and a motion compensation prediction signal, which is obtained from a reference picture that is used for the other prediction (L1 prediction), is an L1 motion compensation prediction signal.

(1) Case of Inter-Frame Prediction of a P (Predictive) Slice:

If the L0 motion compensation prediction signal is $Y_0$ and the weighting factor is $W_0$, the weighted prediction unit 309 generates a weighted prediction signal $W_0Y_0$. The weighting factor $W_0$ is included in the motion video stream (H.264 stream) that is sent from the encoder.

(2) Case of Prediction of B (Bi-Predictive Slice) Slice Using Only One Reference Picture:

If the L0 (or L1) motion compensation prediction signal is $Y_0$ (or $Y_1$) and the weighting factor is $W_0$ (or $W_1$), the weighted prediction unit 309 generates a weighted prediction signal $W_0Y_0$ (or $W_1Y_1$). The weighting factor $W_0$ (or $W_1$) is included in the H.264 stream.

(3) Case of B Slice Using Two Reference Pictures:

(3-1) Explicit Mode

If the L0, L1 motion compensation prediction signal is $Y_0$, $Y_1$, the weighting factor is $W_0$, $W_1$ and an offset is D, the weighted prediction unit 309 generates a weighted prediction signal $W_0Y_0+W_1Y_1+D$. The weighting factor $W_0$, $W_1$ and the offset D are included in the H.264 stream.

(3-2) Implicit Mode

In the implicit mode, the weighting factor $W_0$, $W_1$ and the offset D are not included in the H.264 stream. In FIG. 25, if the time distance to the reference picture 0 (the time interval between the reference picture 0 and the to-be-decoded picture) is tb and the time distance to the reference picture 1 (the time interval between the reference picture 1 and the to-be-decoded picture) is td, the weighted prediction unit 309 calculates the weighting factor $W_0$, $W_1$ and the offset D, according to equations below, and generates a weighted prediction signal $W_0Y_0+W_1Y_1+D$:

$W_1 = tb/td$ $W_0 = 1 - W_1$ $D = 0$.

The weighted prediction process can enhance the quality of video with a brightness varying with time, as in the case of fade-in/fade-out. However, a processing amount necessary for software decoding increases for that.

In the fifth embodiment, in order to realize real-time decoding of the motion video stream within the limited time period even if the load on the computer 10 increases, either the entire decoding process (normal decoding process) as described with reference to FIG. 4, or a special decoding process is selectively executed in accordance with the load on the computer 10. In the fifth embodiment, the special decoding process is a decoding process in which the process relating to the weighted prediction is simplified. In the special decoding process, the following process is executed. That is, in the case where the value of the weighting factor is zero or thereabout, the weighted prediction signal is regarded as being zero, and decoded video is generated on the basis of the prediction error signal alone.

Figure 24:
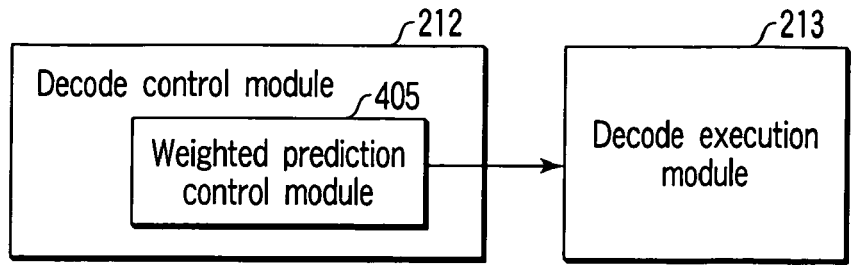
FIG. 24 shows the structure of a decode control module that is used in a computer according to a fifth embodiment of the invention.

In order to realize the special decoding process, the decode control module 212 includes a weighted prediction control module 405, as shown in FIG. 24. When the load on the computer 10 is greater than a predetermined reference value, the weighted prediction control module 405 executes a weighted prediction control process including a process for determining whether the value of the weighting factor is less than a predetermined value, and a process for setting the weighted prediction signal at zero if the value of the weighting factor is less than the predetermined value.

Figure 26:
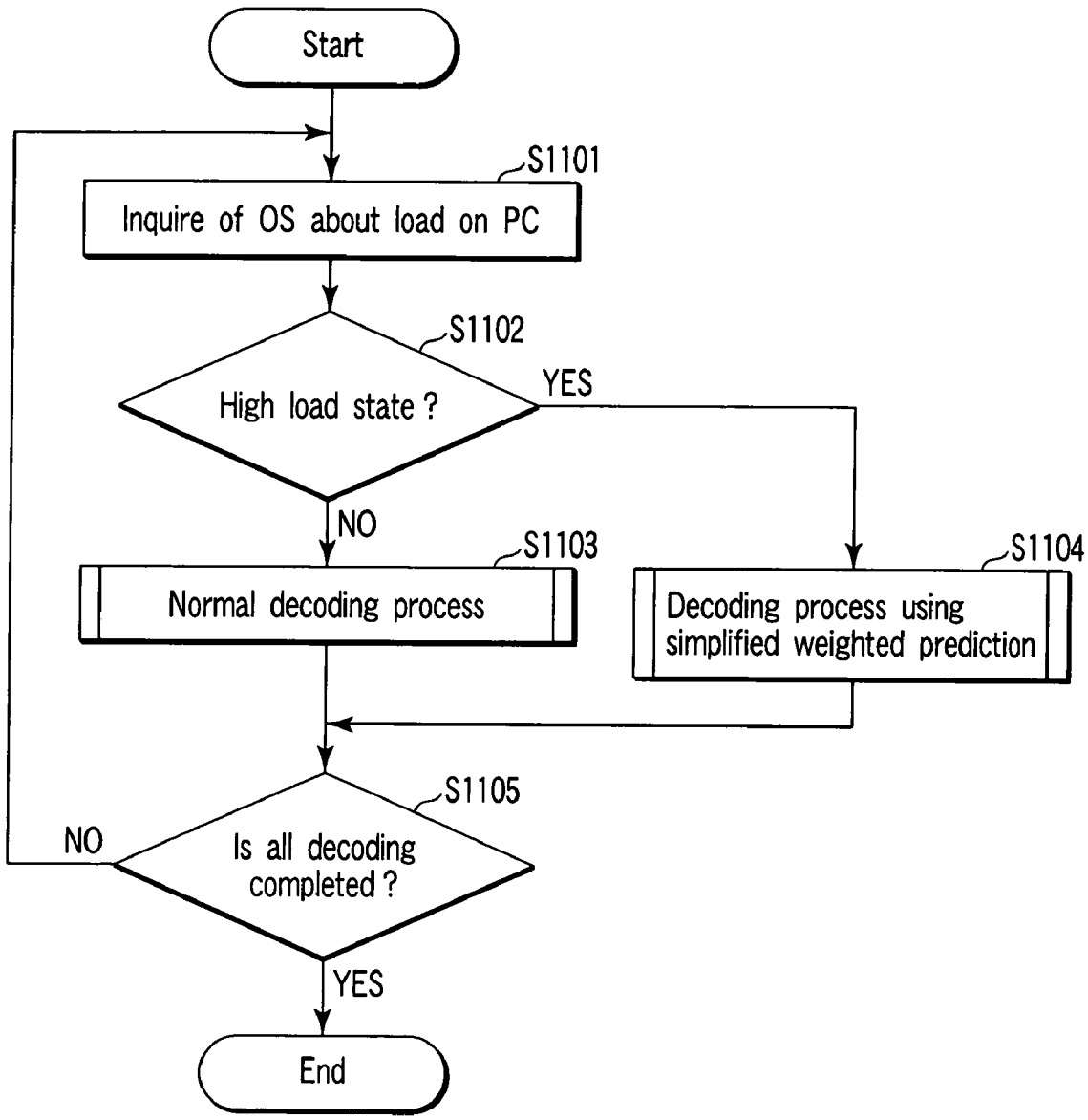
FIG. 26 is a flow chart illustrating the procedure of a decoding process that is executed by the video reproduction application program according to the fifth embodiment.

Referring now to a flow chart of FIG. 26, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S1101). In step S1101, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S1102). In step S1102, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S1102), the video reproduction application program 201 selects the above-mentioned normal decoding process as the decoding process to be executed by the CPU 111, and executes the above-described series of processes on the CPU 111, as described with reference to FIG. 4 (step S1103). Unless the computer 10 goes into the high load state, that is, unless the decoding performance decreases, the motion video stream is decoded by the normal decoding process.

On the other hand, if the computer 10 is in the high load state (YES in step S1102), the video reproduction application program 201 selects the above-described special decoding process as the decoding process to be executed by the CPU 111, and executes on the CPU 111 the decoding process in which the process relating to the weighted prediction is simplified (step S1104). In the special decoding process in step S1104, the video reproduction application program 201 skips the process of calculating the prediction signal if the weighting factor corresponding to the to-be-decoded picture is less than the predetermined value, that is, if the weighting factor $W_0$, $W_1$ is 0 or approximately 0. In other words, if the weighting factor $W_0$, $W_1$ is 0 or approximately 0, the video reproduction application program 201 outputs the weighted prediction signal that is set at zero.

By simplifying the process relating to the weighted prediction, the reproduced picture does not exactly coincide with the encoded picture. However, the amount of processing necessary for the software decoding of 1 picture can greatly be reduced. Thus, even if some other program is executed during the execution of the software decoding and the computer 10 transits to the high load state, it is possible to smoothly and continuously execute decoding and reproduction of motion video data, without such problems as frame dropping or extreme slowness in motion of objects.

Until the motion video stream is completely decoded, the above-described process of steps S1101 to S1104 is repeated (step S1105). If the execution of the other program is finished and the load on the computer 10 decreases, the decoding process is switched from the special decoding process back to the normal decoding process.

Figure 27:
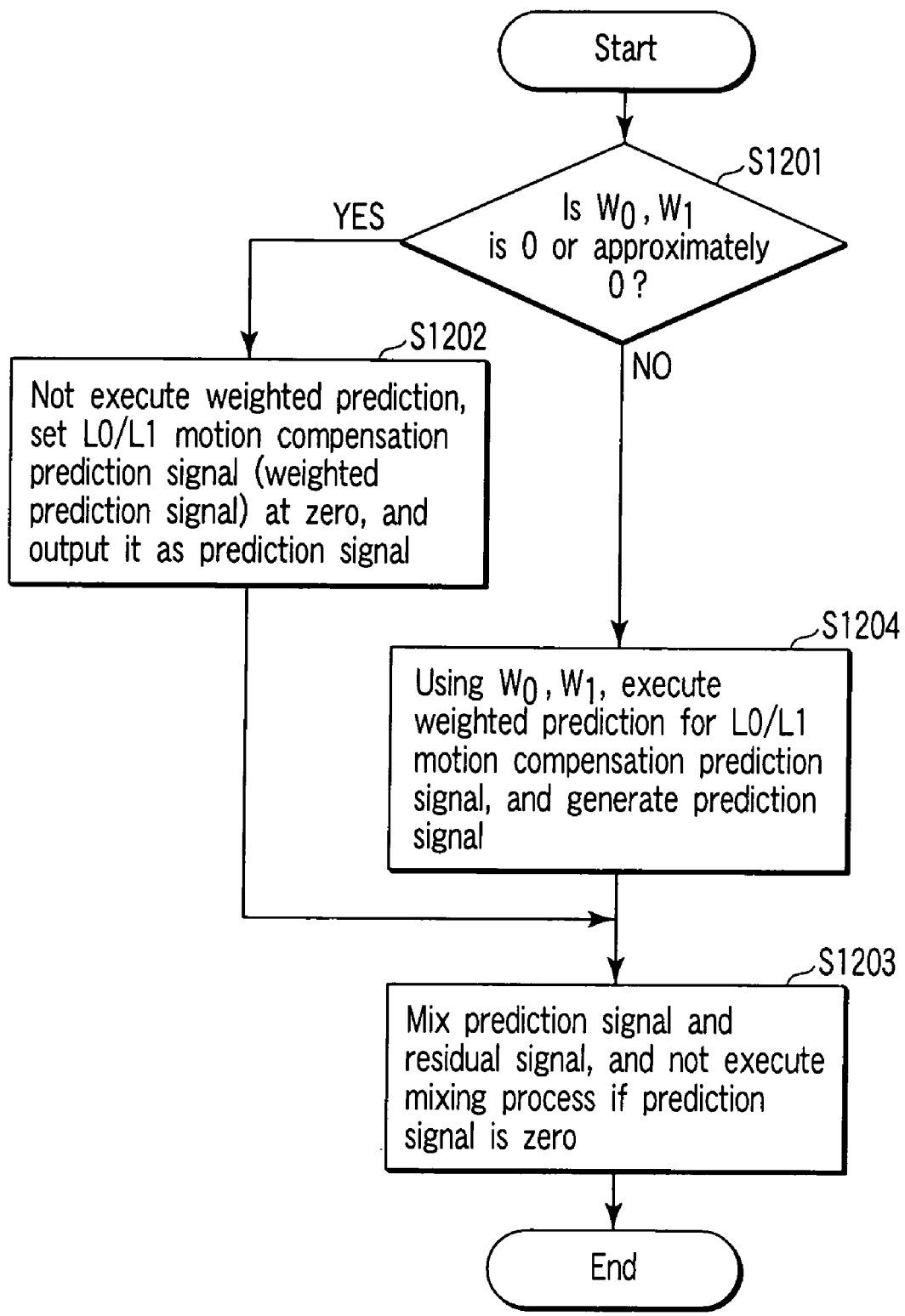
FIG. 27 is a flow chart illustrating the procedure of a special decoding process that is executed by the video reproduction application program according to the fifth embodiment.

Referring now to a flow chart of FIG. 27, the procedure of the special decoding process that is executed by the video reproduction application program 201 is described.

To start with, the video reproduction application program 201 determines whether the weighting factor $W_0$, $W_1$ is 0 or approximately 0 (step S1201). In step S1201, the video reproduction application program 201 determines whether the weighting factor $W_0$, $W_1$ corresponding to the to-be-decoded picture is 0 or approximately 0, by finding whether the weighting factor $W_0$, $W_1$ falls within the range of, e.g. −5 to 5. If the weighting factor $W_0$, $W_1$ falls within the range of −5 to 5, that is, if the weighting factor $W_0$, $W_1$ is 0 or approximately 0 (YES in step S1201), the video reproduction application program 201 skips the execution of the weighted prediction process and outputs the weighted prediction signal having the value of zero (step S1202). The video reproduction application program 201 does not mix (add) the prediction error signal and the weighted prediction signal, and outputs the prediction error signal as decoded video of the to-be-decoded block (step S1203).

On the other hand, if the weighting factor $W_0$, $W_1$ is not 0 or approximately 0, that is, if the weighting factor $W_0$, $W_1$ does not fall within the range of −5 to 5 (NO in step S1201), the video reproduction application program 201 executes the same weighted prediction process as the normal decoding process, and generates the weighted prediction signal (step S1204). The video reproduction application program 201 mixes (adds) the prediction error signal and the weighted prediction signal, and outputs decoded video of the to-be-decoded block (step S1203).

As has been described above, according to the fifth embodiment, when the system is in the high load state, the load on the system is decreased by simplifying the weighted prediction process that requires a great amount of processing. Thereby, smooth motion video reproduction is realized without such problems as frame dropping or extreme slowness in motion of objects.

The decode control process according to the fifth embodiment is entirely realized by the computer program. Thus, only by installing the computer program in an ordinary computer via a computer-readable memory medium, can the same advantage as with the fifth embodiment easily be attained.

Sixth Embodiment

Figure 28:
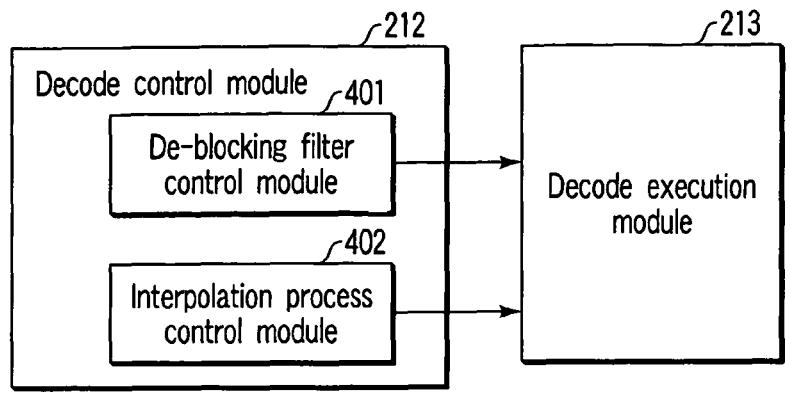
FIG. 28 shows the structure of a decode control module that is used in a computer according to a sixth embodiment of the invention.
Figure 29:
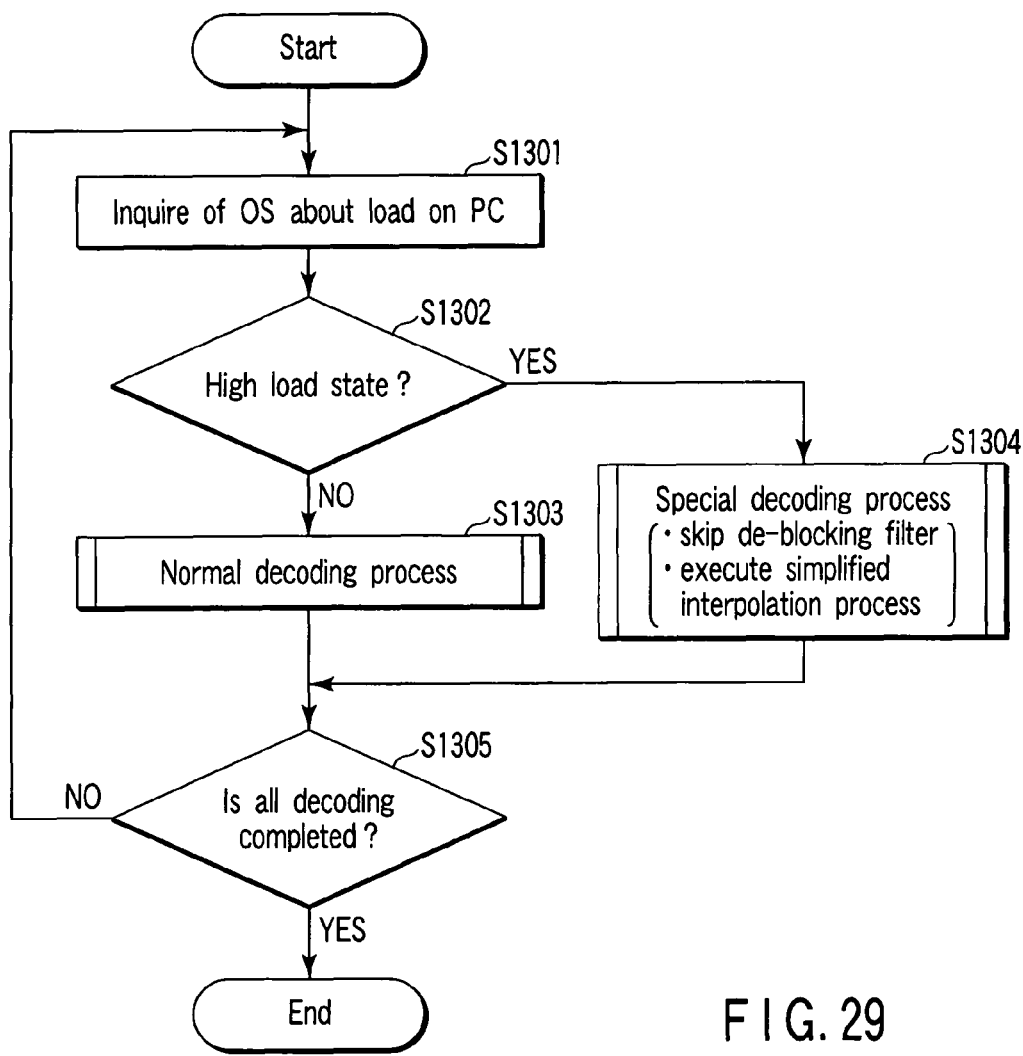
FIG. 29 is a flow chart illustrating the procedure of a decoding process that is executed by a video reproduction application program for use in the sixth embodiment.
Figure 30:
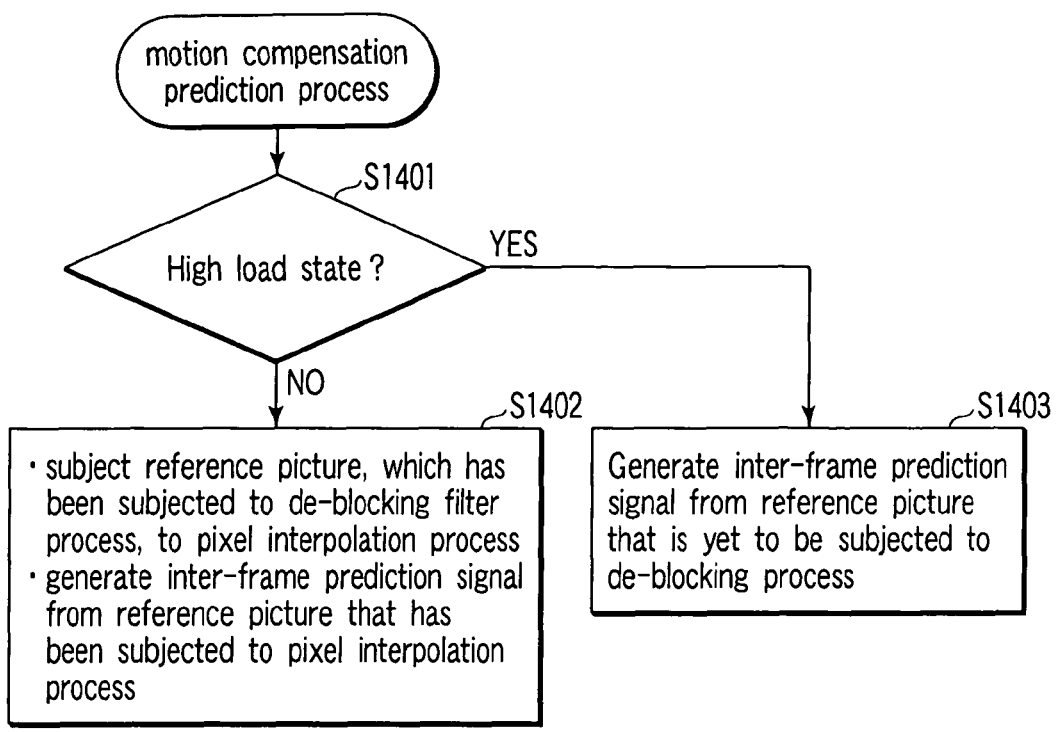
FIG. 30 is a flow chart illustrating the procedure of a motion compensation prediction process that is executed by the video reproduction application program according to the sixth embodiment.

Next, referring to FIG. 28 to FIG. 30, a computer 10 according to a sixth embodiment of the invention is described.

A description is given of only parts that are different from the parts of the first embodiment, and a description of the common parts to the first embodiment is omitted.

In the sixth embodiment, in order to realize real-time decoding of the motion video stream within the limited time period even if the load on the computer 10 increases, either the decoding process (referred to as "normal decoding process") as described with reference to FIG. 4, or a special decoding process is selectively executed in accordance with the load on the computer 10. In the special decoding process of the sixth embodiment, both the de-blocking filter control process as described in the first embodiment and the pixel interpolation control process as described in the second embodiment are executed.

In order to realize the special decoding process, the decode control module 212, as shown in FIG. 28, includes the above-described de-blocking filter control module 401 and the above-described interpolation process control module 402. When the load on the computer 10 is greater than a predetermined reference value, the de-blocking filter control module 401 skips the execution of the de-blocking filter process. When the load on the computer 10 is greater than a predetermined reference value, the interpolation process control module 402 alters or simplifies the content of the pixel interpolation process. Specifically, under the control of the interpolation process control module 402, the motion compensation prediction unit 300 shown in FIG. 4 executes the following motion compensation prediction process.

When the load on the computer 10 is not greater than the predetermined reference value, the motion compensation prediction unit 300 subjects one or more reference pictures, which have been subjected to the de-blocking filter process, to the pixel interpolation process, and generates a motion compensation inter-frame prediction signal from the one or more reference pictures that have been subjected to the pixel interpolation process, on the basis of the motion vector information. On the other hand, when the load on the computer 10 is greater than the predetermined reference value, the motion compensation prediction unit 300 skips the pixel interpolation process, and generates, on the basis of motion vector information, an inter-frame prediction signal from one or more reference pictures that are stored in the frame memory 306 and are not subjected to the de-blocking filter process.

Referring now to a flow chart of FIG. 29, an example of the procedure of the decoding process that is executed by the video reproduction application program 201 is described.

While the decoding process is being executed, the video reproduction application program 201 periodically repeats the process for detecting current load on the computer by inquiring of the OS about the current load of computer 10 (step S1301). In step S1301, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S1302). In step S1302, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S1302), the video reproduction application program 201 selects the above-mentioned normal decoding process as the decoding process to be executed by the CPU 111, and executes the above-described series of processes on the CPU 111, as described with reference to FIG. 4 (step S1303). Unless the computer 10 goes into the high load state, that is, unless the decoding performance decreases, the motion video stream is decoded by the normal decoding process.

On the other hand, if the computer 10 is in the high load state (YES in step S1302), the video reproduction application program 201 selects the above-described special decoding process as the decoding process to be executed by the CPU 111. Thereby, the de-blocking filter process is omitted from the series of processes as described with reference to FIG. 4, and the content of the interpolation process is altered to a simplified interpolation process (S1304). In the simplified interpolation process, the interpolation process is skipped, as described above. Like the second embodiment, it is optionally possible to execute the process for varying the pixel precision of interpolation pixels that are generated by the pixel interpolation process, or the process for varying the number of taps of the filter for executing the pixel interpolation process.

By skipping both the de-blocking filter process and interpolation process, the processing amount necessary for software decoding of 1 picture is remarkably decreased. Hence, even if some other program is executed during the execution of the software decoding and the computer 10 transits to the high load state, it is possible to smoothly and continuously execute decoding and reproduction of motion video data without such problems as frame dropping or extreme slowness in motion of objects.

Until the motion video stream is completely decoded, the above-described process of steps S1301 to S1304 is repeated (step S1305). If the execution of the other program is finished and the load on the computer 10 decreases, the decoding process is switched from the special decoding process back to the normal decoding process.

Next, referring to a flow chart of FIG. 30, the procedure of the motion compensation prediction process that is executed by the sixth embodiment is described.

If the CPU 111 is not in the high load state (NO in step S1401), the video reproduction application program 201 reads out one or more reference pictures, which have been subjected to the de-blocking filter process, from the frame memory 306, and executes the pixel interpolation process for the read-out reference picture (step S1402). The read-out reference picture is a picture which is referred by the to-be-decoded picture. In step S1402, the video reproduction application program 201 generates a motion compensation inter-frame prediction signal corresponding to the to-be-decoded picture, from the reference picture that has been subjected to the pixel interpolation process, on the basis of the motion vector information corresponding to the to-be-decoded picture.

If the CPU 111 is in the high load state (YES in step S1401), the video reproduction application program 201 reads out one or more reference pictures, which are not subjected to the de-blocking filter process, from the frame memory 306, and generates a motion compensation inter-frame prediction signal corresponding to the to-be-decoded picture, from the read-out reference picture, on the basis of the motion vector information corresponding to the to-be-decoded picture (step S1403).

As has been described above, according to the sixth embodiment, when the system is in the high load state, the load on the system is decreased by skipping both the de-blocking filter process and interpolation process, each of which requires a great amount of processing. Thereby, smooth motion video reproduction is realized without such problems as frame dropping or extreme slowness in motion of objects.

The decode control process according to the sixth embodiment is entirely realized by the computer program. Thus, only by installing the computer program in an ordinary computer via a computer-readable memory medium, can the same advantage as with the sixth embodiment easily be attained.

Seventh Embodiment

Figure 31:
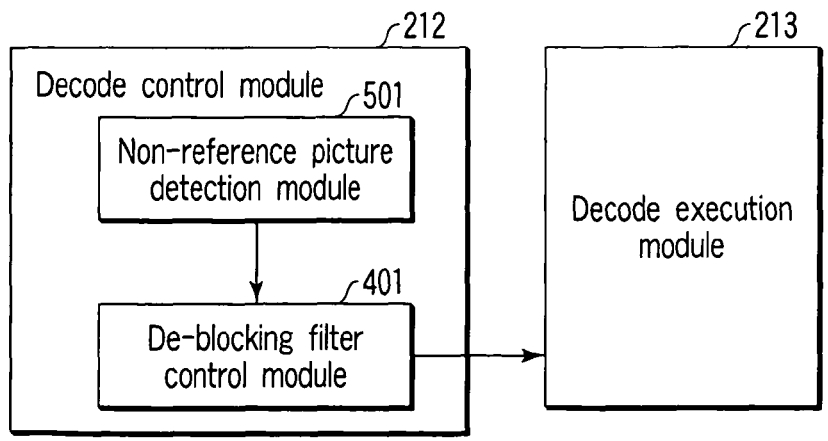
FIG. 31 shows the structure of a decode control module that is used in a computer according to a seventh embodiment of the invention.
Figure 32:
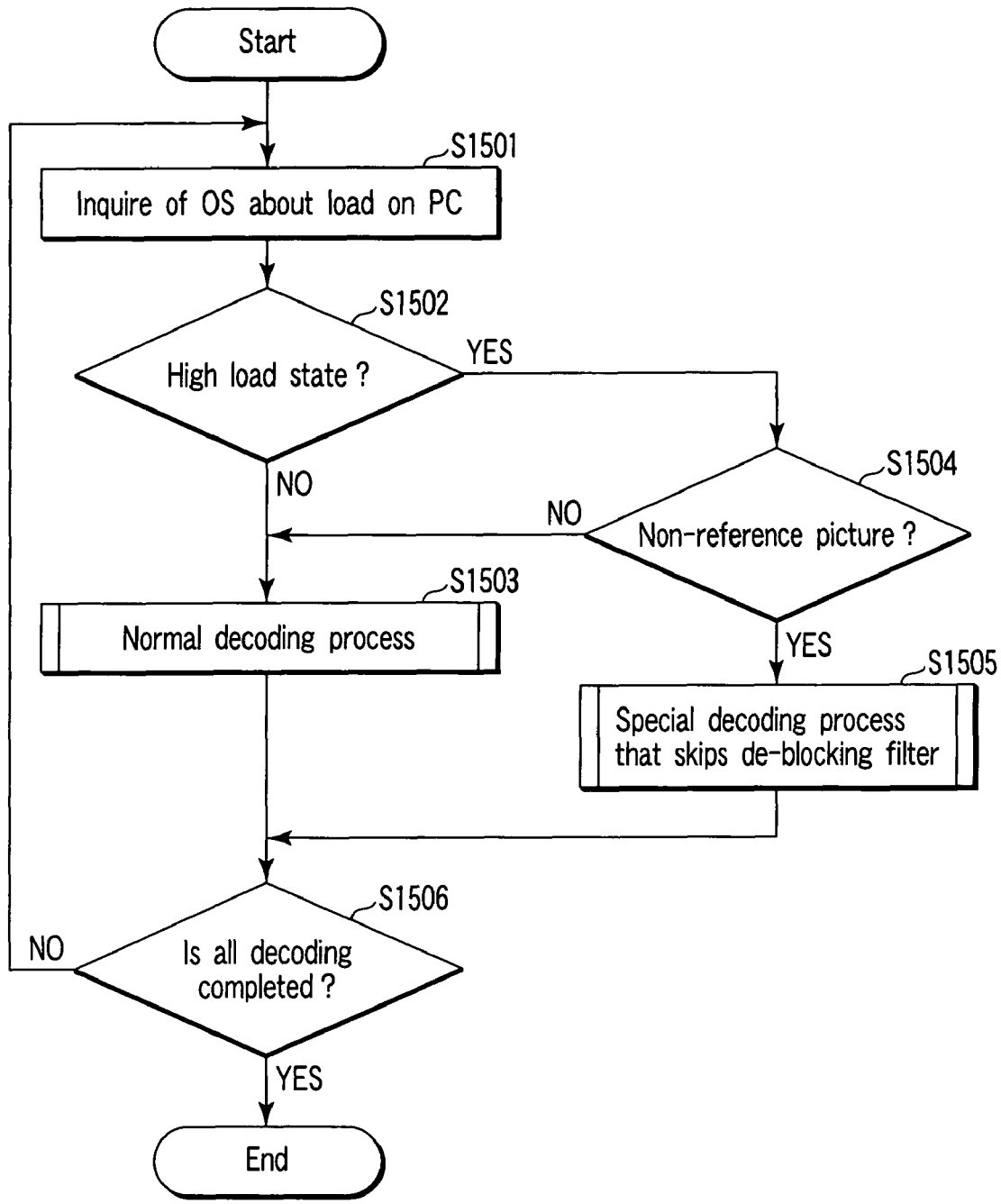
FIG. 32 is a flow chart illustrating the procedure of a decoding process that is executed by a video reproduction application program for use in the seventh embodiment.

Next, referring to FIG. 31 and FIG. 32, a computer 10 according to a seventh embodiment of the invention is described.

A description is given of only parts that are different from the parts of the first embodiment, and a description of the common parts to the first embodiment is omitted.

In the seventh embodiment, a special decoding process, in which the execution of the de-blocking filter process is skipped, is executed on condition that the computer 10 is in the high load state and the to-be-decoded picture is a non-reference picture.

In order to realize this special decoding process, the decode control module 212, as shown in FIG. 31, includes a non-reference picture detection module 501 in addition to the above-described de-blocking filter control module 401. The non-reference picture detection module 501 determines whether the to-be-decoded picture is a non-reference picture or not. Under the control of the non-reference picture detection module 501, the de-blocking filter control module 401 skips the execution of the de-blocking filter process for the decoded picture on condition that the decoded picture that is obtained by the adder unit 304 is a non-reference picture and the computer 10 is in the high load state.

Referring now to a flow chart of FIG. 32, an example of the procedure of the decoding process that is executed by the video reproduction application program 201 is described.

While the decoding process is being executed, the video reproduction application program 201 periodically repeats the process for detecting current load on the computer by inquiring of the OS about the current load of computer 10 (step S1501). In step S1501, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S1502). In step S1502, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S1502), the video reproduction application program 201 selects the above-mentioned normal decoding process as the decoding process to be executed by the CPU 111, and executes the above-described series of processes on the CPU 111, as described with reference to FIG. 4 (step S1503). Unless the computer 10 goes into the high load state, that is, unless the decoding performance decreases, the motion video stream is decoded by the normal decoding process.

On the other hand, if the computer 10 is in the high load state (YES in step S1502), the video reproduction application program 201 determines, based on the syntax information, whether the to-be-decoded picture is a non-reference picture, that is, the decoded picture obtained by the adder unit 304 is a non-reference picture (step S1504). If the to-be-decoded picture is a non-reference picture (YES in step S1504), the video reproduction application program 201 selects the above-described special decoding process as the decoding process to be executed by the CPU 111, and executes on the CPU 111 the process from which the de-blocking filter process in the series of processes described with reference to FIG. 4 is excluded (step S1505). In this case, decoded pictures that are not subjected to the de-blocking filter process are stored in the frame memory 306. Thus, a motion compensation inter-frame prediction signal corresponding to the to-be-decoded picture is generated from one or more decoded pictures that are not subjected to the de-blocking filter process.

If the to-be-decoded picture is not a non-reference picture, that is, if the decoded picture obtained by the adder unit 304 is a reference picture (NO in step S1504), the video reproduction application program 201 executes the normal decoding process, without skipping the de-blocking filter process (step S1503).

Until the motion video stream is completely decoded, the above-described process of steps S1501 to S1504 is repeated (step S1506).

In the seventh embodiment, the de-blocking filter process is skipped for only the non-reference picture, and the de-blocking filter process is normally executed for the reference picture. It is thus possible to reduce the load on the system, while preventing block distortion, which is contained in a picture, from being propagated to other pictures.

The decode control process according to the seventh embodiment is entirely realized by the computer program. Thus, only by installing the computer program in an ordinary computer via a computer-readable memory medium, can the same advantage as with the seventh embodiment easily be attained.

Eighth Embodiment

Figure 33:
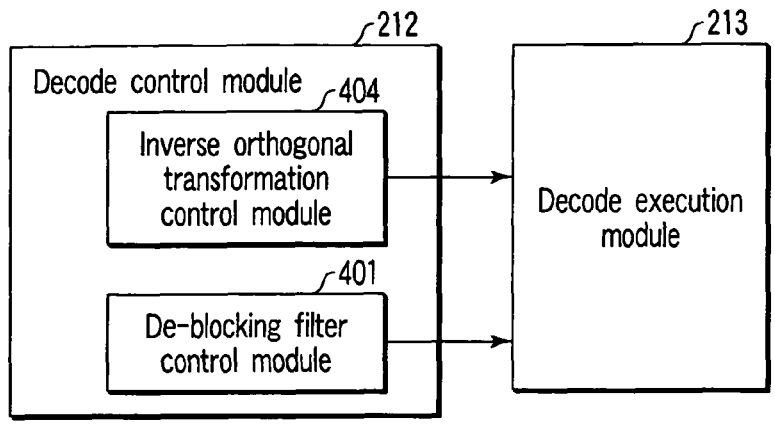
FIG. 33 shows the structure of a decode control module that is used in a computer according to an eighth embodiment of the invention.
Figure 34:
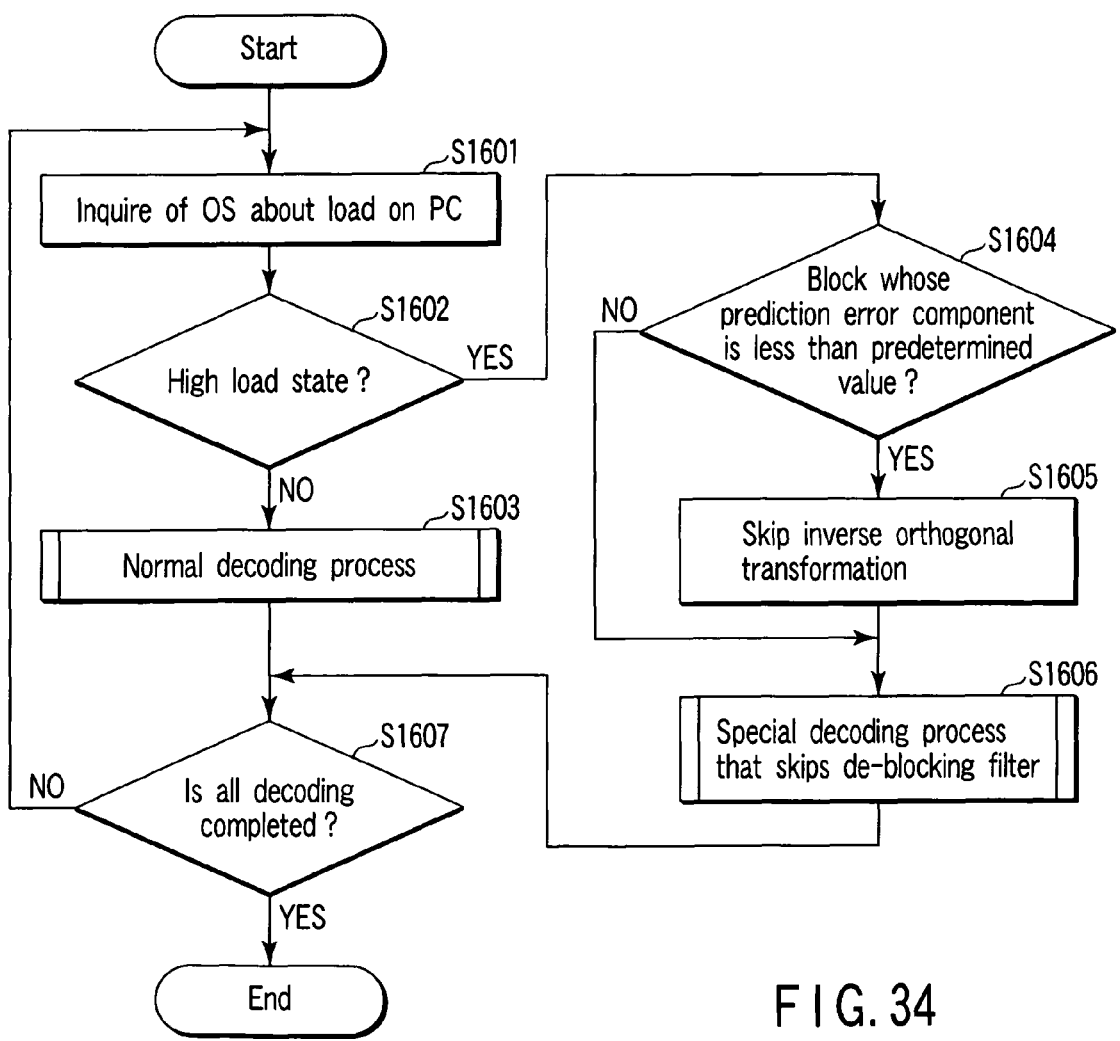
FIG. 34 is a flow chart illustrating the procedure of a decoding process that is executed by a video reproduction application program for use in the eighth embodiment.
Figure 35:
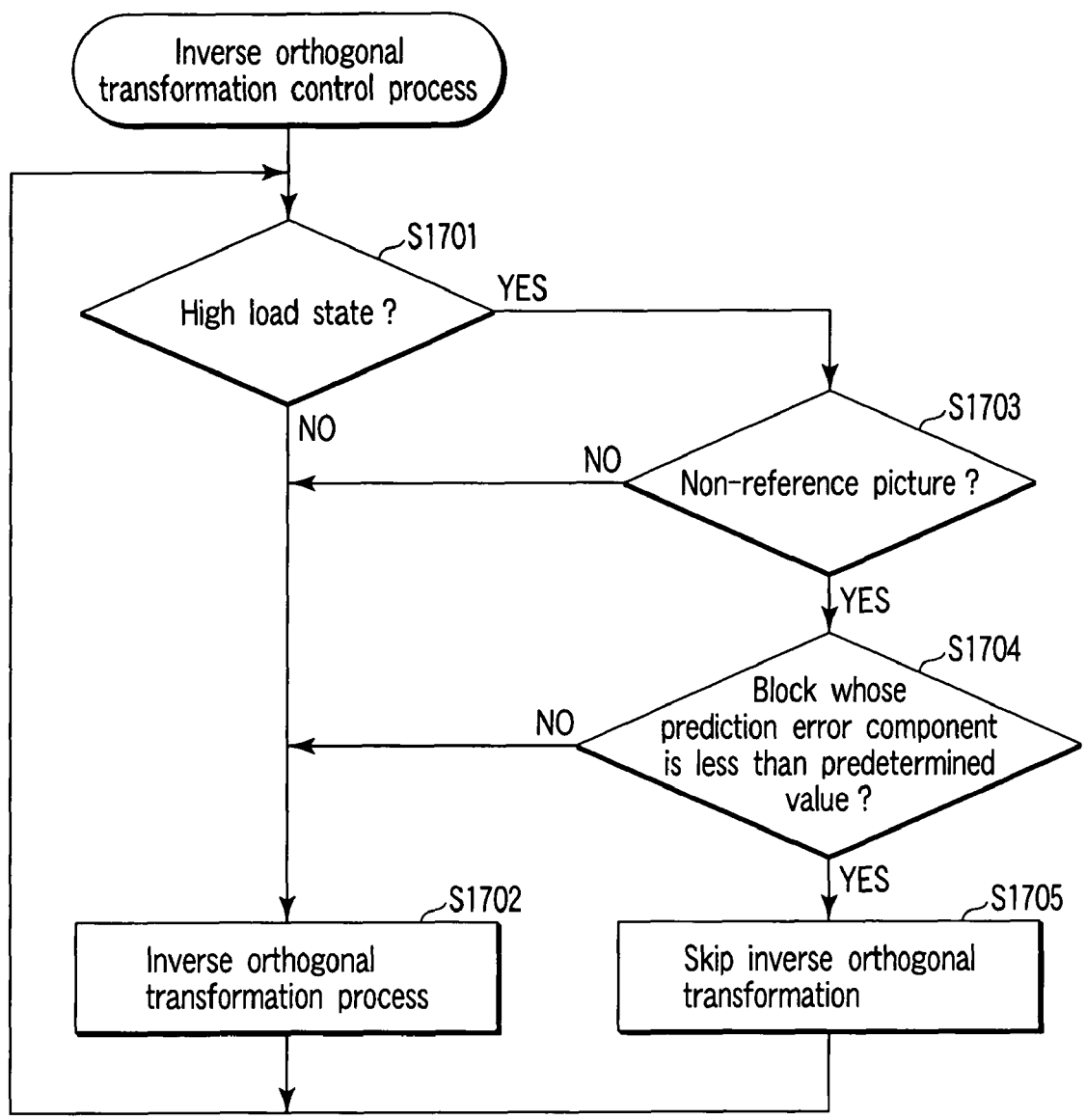
FIG. 35 is a flow chart illustrating the procedure of an inverse orthogonal transformation control process that is executed by the video reproduction application program according to the eighth embodiment.

Next, referring to FIG. 33 to FIG. 35, a computer 10 according to an eighth embodiment of the invention is described.

A description is given of only parts that are different from the parts of the first embodiment, and a description of the common parts to the first embodiment is omitted.

In the eighth embodiment, in order to realize real-time decoding of the motion video stream within the limited time period even if the load on the computer 10 increases, either the decoding process (referred to as "normal decoding process") as described with reference to FIG. 4, or a special decoding process is selectively executed in accordance with the load on the computer 10. In the special decoding process of the eighth embodiment, both the de-blocking filter control process as described in the first embodiment and the inverse orthogonal transformation control process as described in the fourth embodiment are executed.

In order to realize the special decoding process, the decode control module 212, as shown in FIG. 33, includes the above-described de-blocking filter control module 401 and the above-described inverse orthogonal transformation control module 404. If the load on the computer 10 is greater than the predetermined reference value, the inverse orthogonal transformation control module 404 detects a block, whose prediction error component is smaller than a predetermined value, from a plurality of blocks that form the to-be-decoded picture, and skips execution of the inverse orthogonal transformation process for each detected block and sets a prediction error signal corresponding to each detected block at zero. The de-blocking filter control module 401 skips execution of the de-blocking filter process if the load on the computer 10 is greater than the predetermined reference value.

Referring now to a flow chart of FIG. 34, an example of the procedure of the decoding process that is executed by the video reproduction application program 201 is described.

While the decoding process is being executed, the video reproduction application program 201 periodically repeats the process for detecting current load on the computer by inquiring of the OS about the current load of computer 10 (step S1601). In step S1601, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S1602). In step S1602, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S1602), the video reproduction application program 201 selects the above-mentioned normal decoding process as the decoding process to be executed by the CPU 111, and executes the above-described series of processes on the CPU 111, as described with reference to FIG. 4 (step S1603). Unless the computer 10 goes into the high load state, that is, unless the decoding performance decreases, the motion video stream is decoded by the normal decoding process.

On the other hand, if the computer 10 is in the high load state (YES in step S1602), the video reproduction application program 201 executes the inverse orthogonal transformation control process (step S1604, S1605). Specifically, on the basis of the values of orthogonal transformation coefficients included in each of a plurality of blocks that form a to-be-decoded picture, the video reproduction application program 201 determines whether each of the blocks is a block whose prediction error component is smaller than a predetermined value (step S1604).

If the to-be-processed block is the block whose prediction error component is smaller than the predetermined value (YES in step S1604), the video reproduction application program 201 skips the execution of the inverse orthogonal transformation process for the to-be-processed block, and executes the process for setting the prediction error signal of the to-be-processed block at zero (step S1605). If the to-be-processed block is not the block whose prediction error component is smaller than the predetermined value (NO in step S1604), the video reproduction application program 201 executes the inverse orthogonal transformation process as in the normal case.

Thereafter, the video reproduction application program 201 skips the execution of the de-blocking filter process (step S1606). In this case, a decoded picture, which is not subjected to the de-blocking filter process, is stored in the frame memory 306. Thus, the motion compensation inter-frame prediction signal corresponding to the to-be-decoded picture is generated from one or more decoded pictures that are not subjected to the de-blocking filter process.

Until the motion video stream is completely decoded, the above-described process of steps S1601 to S1606 is repeated (step S1607).

By using both the de-blocking filter control process and inverse orthogonal transformation control process, the load on the computer 10, which relates to the decoding process, can be more reduced, and smooth motion video reproduction can be realized.

In the eighth embodiment, the inverse orthogonal transformation control process may be executed on condition that the computer 10 is in the high load state and the to-be-decoded picture is a non-reference picture. Thereby, the processing amount in the decoding process can efficiently be reduced while degradation in image quality can be minimized.

FIG. 35 illustrates the procedure of the inverse orthogonal transformation control process.

If the computer 10 is not in the high load state (NO in step S1701), the video reproduction application program 201 executes the inverse orthogonal transformation process as in the normal case (step S1702).

On the other hand, if the computer 10 is in the high load state (YES in step S1701), the video reproduction application program 201 determines, based on the syntax information, whether the to-be-decoded picture is a non-reference picture (step S1703). If the to-be-decoded picture is not a non-reference picture but a reference picture that is referred to by other pictures (NO in step S1703), the video reproduction application program 201 executes the inverse orthogonal transformation process (step S1702).

If the to-be-decoded picture is a non-reference picture (YES in step S1703), the video reproduction application program 201 executes the inverse orthogonal transformation control process. In this case, on the basis of the values of orthogonal transformation coefficients included in each of a plurality of blocks that form a to-be-decoded picture, the video reproduction application program 201 determines whether each of the blocks is a block whose prediction error component is smaller than a predetermined value (step S1704). If the to-be-processed block is the block whose prediction error component is smaller than the predetermined value (YES in step S1704), the video reproduction application program 201 skips the execution of the inverse orthogonal transformation process for the to-be-processed block, and executes the process for setting the prediction error signal of the to-be-processed block at zero (step S1705). If the to-be-processed block is not the block whose prediction error component is smaller than the predetermined value (NO in step S1704), the video reproduction application program 201 executes the inverse orthogonal transformation process (step S1702).

The decode control process according to the eighth embodiment is entirely realized by the computer program. Thus, only by installing the computer program in an ordinary computer via a computer-readable memory medium, can the same advantage as with the eighth embodiment easily be attained.

Ninth Embodiment

Figure 38:
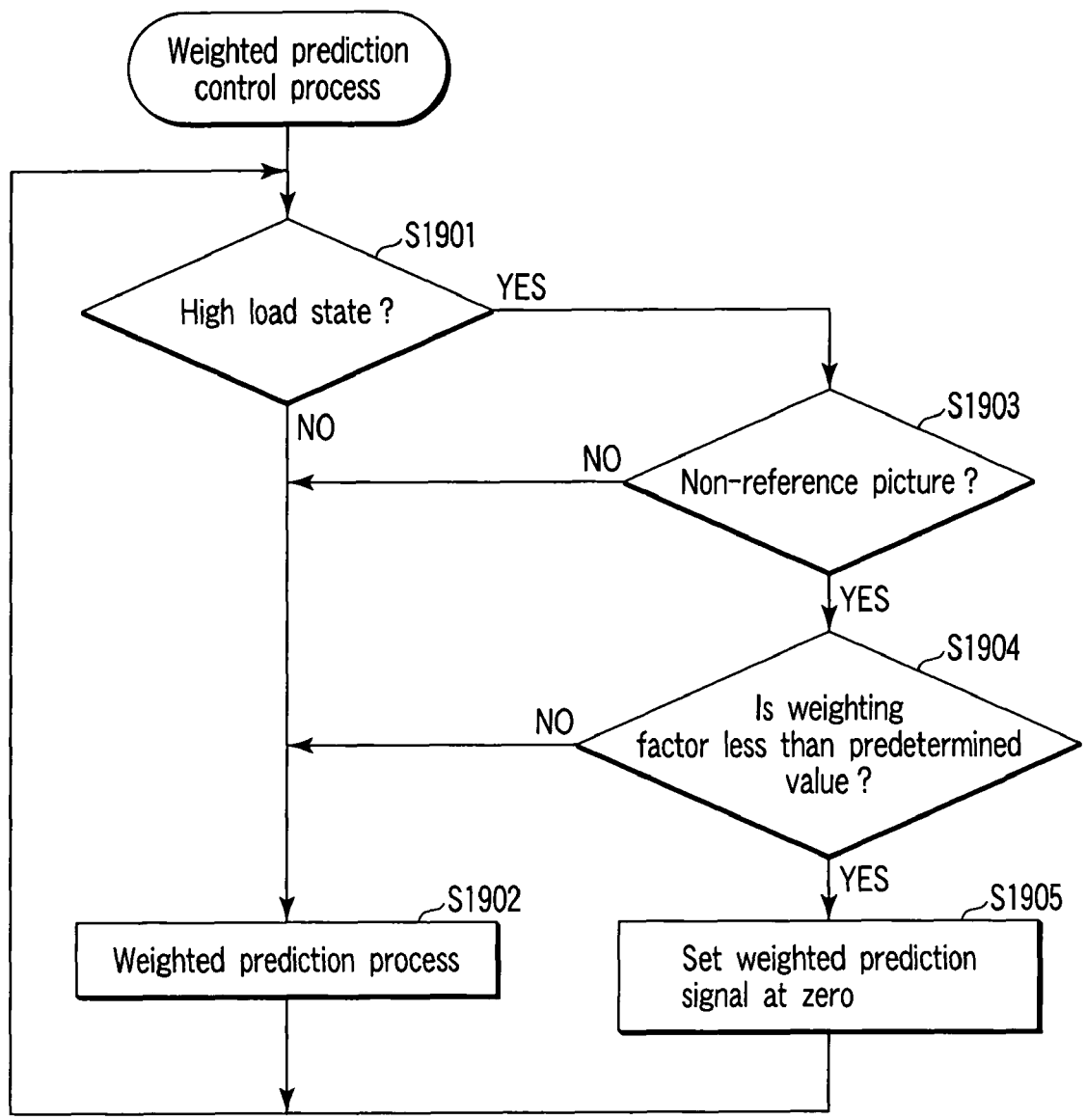
FIG. 38 is a flow chart illustrating the procedure of a weighted prediction control process that is executed by the video reproduction application program according to the ninth embodiment.

Next, referring to FIG. 36 to FIG. 38, a computer 10 according to a ninth embodiment of the invention is described.

A description is given of only parts that are different from the parts of the first embodiment, and a description of the common parts to the first embodiment is omitted.

In the ninth embodiment, in order to realize real-time decoding of the motion video stream within the limited time period even if the load on the computer 10 increases, either the decoding process (referred to as "normal decoding process") as described with reference to FIG. 4, or a special decoding process is selectively executed in accordance with the load on the computer 10. In the special decoding process of the ninth embodiment, both the de-blocking filter control process as described in the first embodiment and the weighted prediction control process as described in the fifth embodiment are executed. The weighted prediction control process is a process for setting the weighted prediction signal at zero and generating decoded video from the prediction error signal alone.

In order to realize the special decoding process, the decode control module 212, as shown in FIG. 36, includes the above-described de-blocking filter control module 401 and the above-described weighted prediction control module 405. When the load on the computer 10 is greater than a predetermined reference value, the de-blocking filter control module 401 skips the execution of the de-blocking filter process. When the load on the computer 10 is greater than a predetermined reference value, the weighted prediction control module 405 executes a weighted prediction control process including a process of determining whether the value of the weighting factor is less than a predetermined value, and a process of setting the weighted prediction signal at zero if the value of the weighting factor is less than the predetermined value.

Referring now to a flow chart of FIG. 37, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S1801). In step S1801, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S1802). In step S1802, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S1802), the video reproduction application program 201 selects the above-mentioned normal decoding process as the decoding process to be executed by the CPU 111, and executes the above-described series of processes on the CPU 111, as described with reference to FIG. 4 (step S1803). Unless the computer 10 goes into the high load state, that is, unless the decoding performance decreases, the motion video stream is decoded by the normal decoding process.

On the other hand, if the computer 10 is in the high load state (YES in step S1802), the video reproduction application program 201 selects the above-described special decoding process as the decoding process to be executed by the CPU 111, thereby skipping the de-blocking filter process from the series of processes described with reference to FIG. 4 and executing the weighted prediction control process for simplifying the content of the weighted prediction (step S1804). In the weighted prediction control process, it is determined whether the value of the weighting factor corresponding to the to-be-decoded picture is less than a predetermined value. If the value of the weighting factor is not less than the predetermined value, the normal weighted prediction process, which multiplies the inter-frame prediction signal corresponding to the to-be-decoded picture by the weighting factor, is executed. Thereby, the weighted prediction signal corresponding to the to-be-decoded picture is generated. The video reproduction application program 201 generates decoded video by adding the prediction error signal and the weighted prediction signal.

If the value of the weighting factor is less than the predetermined value, this value is regarded as zero. The video reproduction application program 201 sets the weighted prediction signal at zero. The video reproduction application program 201 does not add the prediction error signal and the weighted prediction signal, and outputs the prediction error signal as decoded video.

By skipping the de-blocking filter process and executing the weighted prediction control process that simplifies the weighted prediction process, the amount of processing necessary for the software decoding of 1 picture can greatly be reduced. Thus, even if some other program is executed during the execution of the software decoding and the computer 10 transits to the high load state, it is possible to smoothly and continuously execute decoding and reproduction of motion video data, without such problems as frame dropping or extreme slowness in motion of objects.

Until the motion video stream is completely decoded, the above-described process of steps S1801 to S1804 is repeated (step S1805). If the execution of the other program is finished and the load on the computer 10 decreases, the decoding process is switched from the special decoding process back to the normal decoding process.

In the ninth embodiment, the weighted prediction control process may be executed on condition that the computer 10 is in the high load state and the to-be-decoded picture is a non-reference picture. Thereby, the processing amount in the decoding process can efficiently be reduced while degradation in image quality can be minimized.

FIG. 38 illustrates the procedure of the weighted prediction control process.

If the computer 10 is not in the high load state (NO in step S1901), the video reproduction application program 201 executes, as in the normal case, the weighted prediction process that generates the weighted prediction signal by multiplying the inter-frame prediction signal by the weighting factor (step S1902).

On the other hand, if the computer 10 is in the high load state (YES in step S1901), the video reproduction application program 201 determines, based on the syntax information, whether the to-be-decoded picture is a non-reference picture (step S1903). If the to-be-decoded picture is not a non-reference picture but a reference picture that is referred to by other pictures (NO in step S1903), the video reproduction application program 201 executes the weighted prediction process as in the normal case (step S1902).

If the to-be-decoded picture is a non-reference picture (YES in step S1903), the video reproduction application program 201 executes the weighted prediction control process. In this case, the video reproduction application program 201 determines whether the weighting factor corresponding to the to-be-decoded picture is less than the predetermined value (step S1904). If the weighting factor is less than the predetermined value (YES in step S1904), the video reproduction application program 201 outputs the weighted prediction signal of "zero" (step S1905)

The decode control process according to the ninth embodiment is entirely realized by the computer program. Thus, only by installing the computer program in an ordinary computer via a computer-readable memory medium, can the same advantage as with the ninth embodiment easily be attained.

Tenth Embodiment

Figure 41:
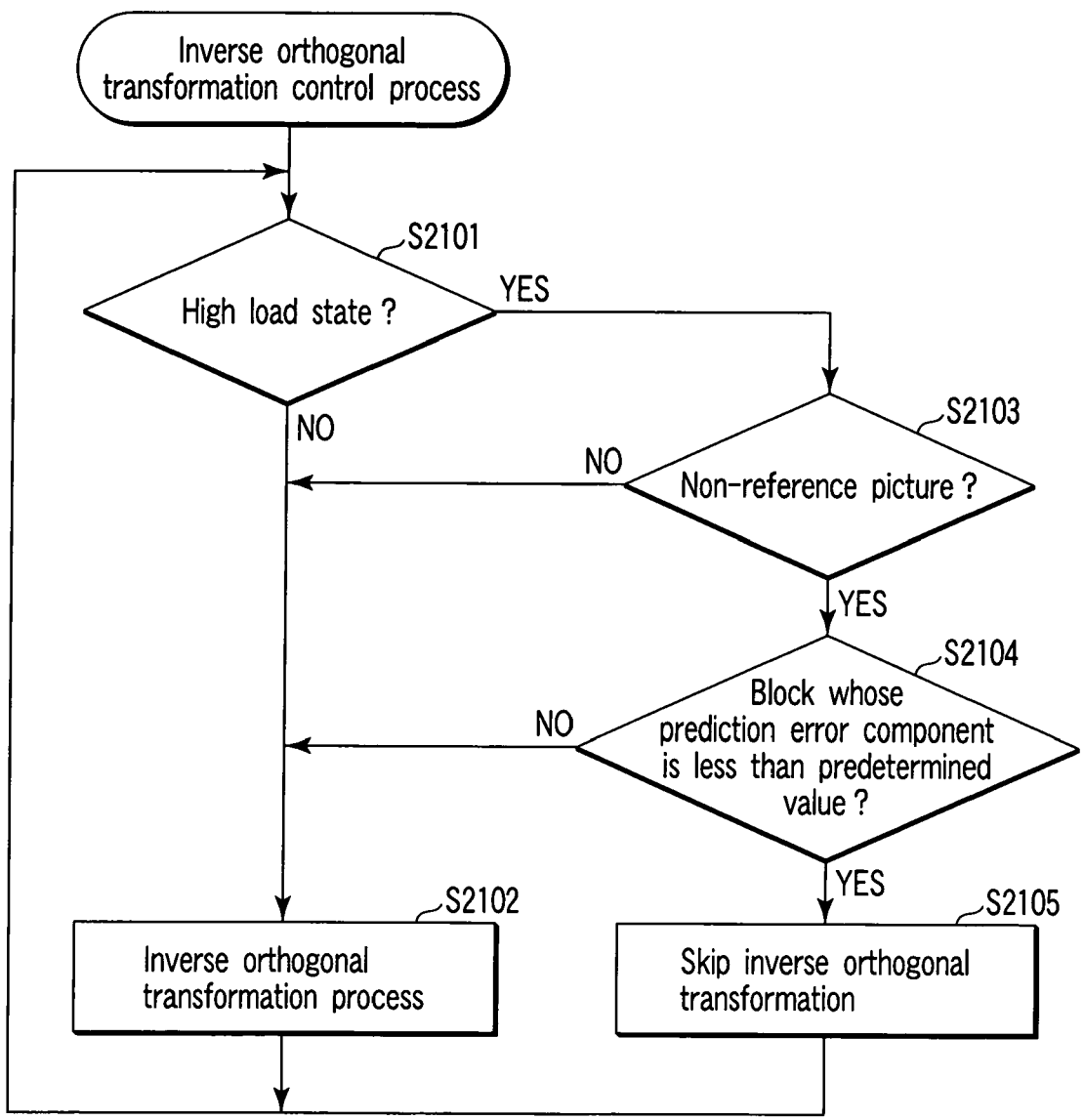
FIG. 41 is a flow chart illustrating the procedure of an inverse orthogonal transformation control process that is executed by the video reproduction application program according to the tenth embodiment.

Next, referring to FIG. 39 to FIG. 41, a computer 10 according to a tenth embodiment of the invention is described.

A description is given of only parts that are different from the parts of the first embodiment, and a description of the common parts to the first embodiment is omitted.

In the tenth embodiment, in order to realize real-time decoding of the motion video stream within the limited time period even if the load on the computer 10 increases, either the decoding process ("normal decoding process") as described with reference to FIG. 4, or a special decoding process is selectively executed in accordance with the load on the computer 10. In the special decoding process of the tenth embodiment, both the special interpolation prediction decoding process as described in the second embodiment and the inverse orthogonal transformation control process as described in the fourth embodiment are executed.

In order to realize the special decoding process, the decode control module 212, as shown in FIG. 39, includes the interpolation process control module 402 described in the second embodiment and the inverse orthogonal transformation control module 404 described in the fourth embodiment. When the load on the computer 10 is greater than a predetermined reference value, the interpolation process control module 402 alters the content of the pixel interpolation process so as to reduce the load on the computer 10. When the load on the computer 10 is greater than a predetermined reference value, the inverse orthogonal transformation control module 404 detects a block, whose prediction error component is smaller than a predetermined value, from a plurality of blocks that form the to-be-decoded picture, and skips execution of the inverse orthogonal transformation process for each detected block and sets a prediction error signal corresponding to each detected block at zero.

Referring now to a flow chart of FIG. 40, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S2001). In step S2001, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S2002). In step S2002, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S2002), the video reproduction application program 201 selects the above-mentioned normal decoding process as the decoding process to be executed by the CPU 111, and executes the above-described series of processes on the CPU 111, as described with reference to FIG. 4 (step S2003). Unless the computer 10 goes into the high load state, that is, unless the decoding performance decreases, the motion video stream is decoded by the normal decoding process.

On the other hand, if the computer 10 is in the high load state (YES in step S2002), the video reproduction application program 201 executes the inverse orthogonal transformation control process (step S2004, S2005). Specifically, on the basis of the values of orthogonal transformation coefficients included in each of a plurality of blocks that form a to-be-decoded picture, the video reproduction application program 201 determines whether each of the blocks is a block whose prediction error component is smaller than a predetermined value (step S2004).

If the to-be-processed block is the block whose prediction error component is smaller than the predetermined value (YES in step S2004), the video reproduction application program 201 skips the execution of the inverse orthogonal transformation process for the to-be-processed block, and executes the process for setting the prediction error signal of the to-be-processed block at zero (step S2005). If the to-be-processed block is not the block whose prediction error component is smaller than the predetermined value (NO in step S2004), the video reproduction application program 201 executes the inverse orthogonal transformation process as in the normal case.

Thereafter, the video reproduction application program 201 executes the special interpolation prediction decoding process (step S2006).

In the normal decoding process, the video reproduction application program 201 executes the motion compensation prediction process that includes a process for subjecting a decoded picture to a pixel interpolation process, and a process of generating an inter-frame prediction signal, which corresponds to the to-be-decoded picture, from the picture that has been subjected to the pixel interpolation process, on the basis of motion vector information included in the motion video stream. On the other hand, in the special interpolation prediction decoding process, the video reproduction application program 201 alters the content of the pixel interpolation process so as to reduce the load on the computer 10. Specifically, the video reproduction application program 201 executes (1) a process for varying the pixel precision of interpolation pixels that are to be generated by the pixel interpolation process, (2) a process for varying the number of taps of the filter for executing the pixel interpolation process, and (3) a process for skipping the execution of the pixel interpolation process.

Until the motion video stream is completely decoded, the above-described process of steps S2001 to S2006 is repeated (step S2007).

By making use of both the special interpolation prediction decoding process and the inverse orthogonal transformation control process, the load on the computer 10, which relates to the decoding process, can further be reduced, and smooth motion video reproduction is realized.

In the tenth embodiment, the inverse orthogonal transformation control process may be executed on condition that the computer 10 is in the high load state and the to-be-decoded picture is a non-reference picture. Thereby, the processing amount in the decoding process can efficiently be reduced while degradation in image quality can be minimized.

FIG. 41 illustrates the procedure of the inverse orthogonal transformation control process.

If the computer 10 is not in the high load state (NO in step S2101), the video reproduction application program 201 executes, as in the normal case, the inverse orthogonal transformation process (step S2102).

On the other hand, if the computer 10 is in the high load state (YES in step S2101), the video reproduction application program 201 determines, based on the syntax information, whether the to-be-decoded picture is a non-reference picture (step S2103). If the to-be-decoded picture is not a non-reference picture but a reference picture that is referred to by other pictures (NO in step S2103), the video reproduction application program 201 executes the inverse orthogonal transformation process (step S2102).

If the to-be-decoded picture is a non-reference picture (YES in step S2103), the video reproduction application program 201 executes the inverse orthogonal transformation control process. In this case, on the basis of the values of orthogonal transformation coefficients included in each of a plurality of blocks that form a to-be-decoded picture, the video reproduction application program 201 determines whether each of the blocks is a block whose prediction error component is smaller than a predetermined value (step S2104). If the to-be-processed block is the block whose prediction error component is smaller than the predetermined value (YES in step S2104), the video reproduction application program 201 skips the execution of the inverse orthogonal transformation process for the to-be-processed block, and executes the process for setting the prediction error signal of the to-be-processed block at zero (step S2105). If the to-be-processed block is not the block whose prediction error component is smaller than the predetermined value (NO in step S2104), the video reproduction application program 201 executes the inverse orthogonal transformation process (step S2102).

The decode control process according to the tenth embodiment is entirely realized by the computer program. Thus, only by installing the computer program in an ordinary computer via a computer-readable memory medium, can the same advantage as with the tenth embodiment easily be attained.

Eleventh Embodiment

Figure 42:
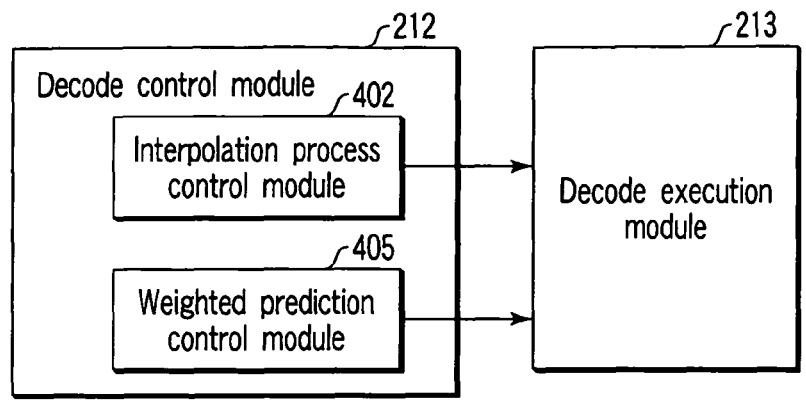
FIG. 42 shows the structure of a decode control module that is used in a computer according to an eleventh embodiment of the invention.
Figure 43:
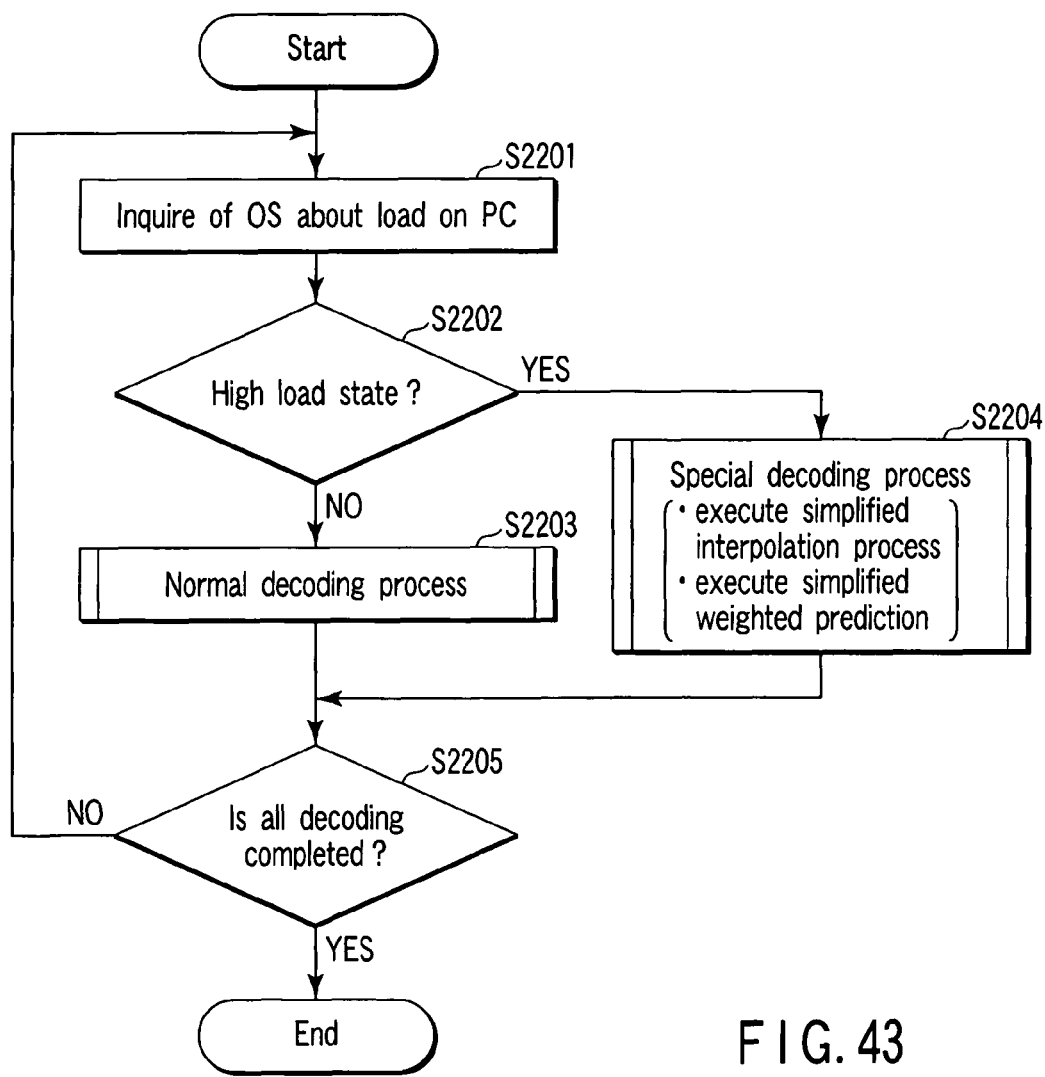
FIG. 43 is a flow chart illustrating the procedure of a decoding process that is executed by a video reproduction application program for use in the eleventh embodiment.
Figure 44:
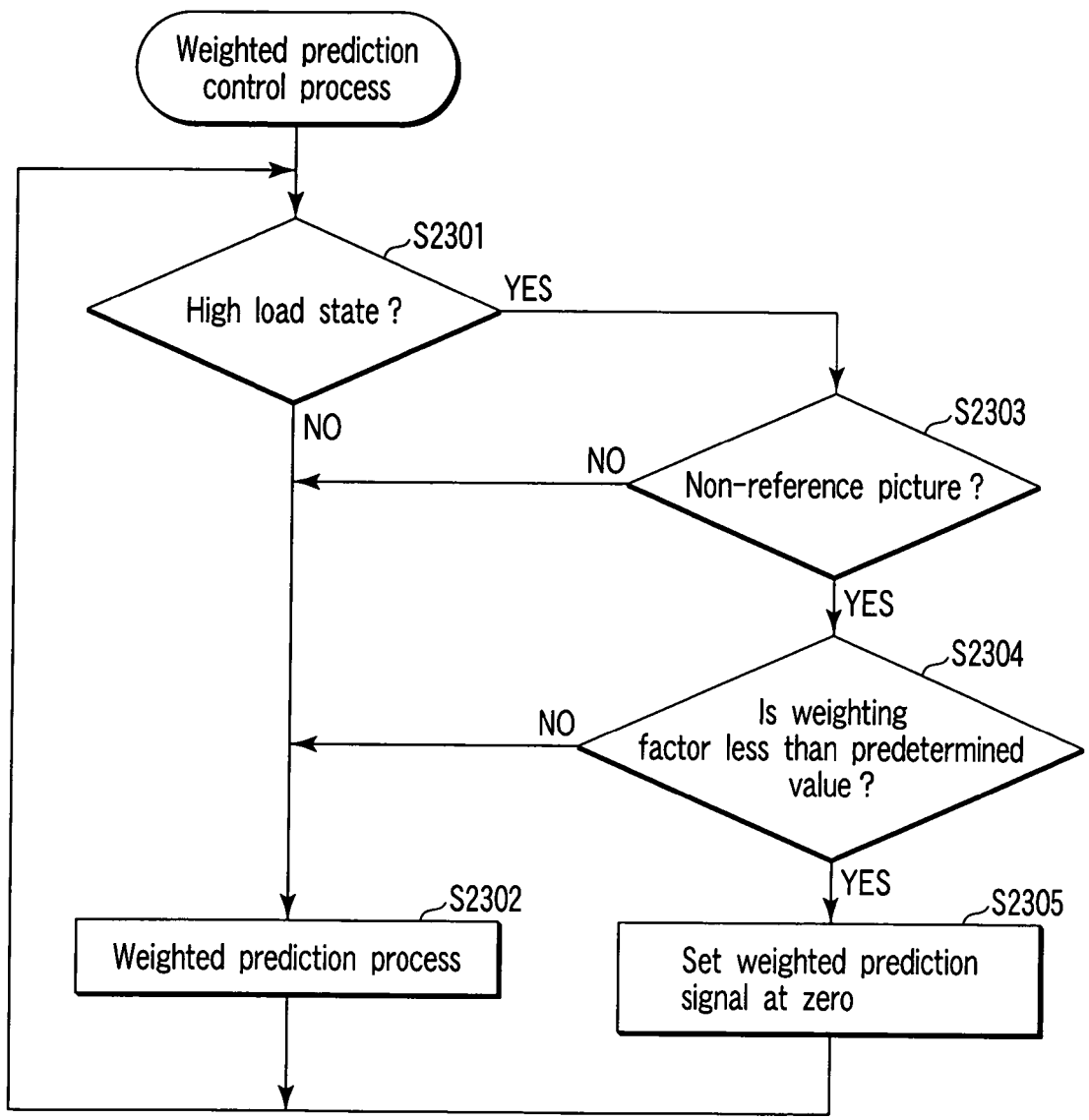
FIG. 44 is a flow chart illustrating the procedure of a weighted prediction control process that is executed by the video reproduction application program according to the eleventh embodiment.

Next, referring to FIG. 42 to FIG. 44, a computer 10 according to an eleventh embodiment of the invention is described.

A description is given of only parts that are different from the parts of the first embodiment, and a description of the common parts to the first embodiment is omitted.

In the eleventh embodiment, in order to realize real-time decoding of the motion video stream within the limited time period even if the load on the computer 10 increases, either the decoding process ("normal decoding process") as described with reference to FIG. 4, or a special decoding process is selectively executed in accordance with the load on the computer 10. In the special decoding process of the eleventh embodiment, both the special interpolation prediction decoding process as described in the second embodiment and the weighted prediction control process as described in the fifth embodiment are executed. The weighted prediction control process is a process for setting the weighted prediction signal at zero and generating decoded video from the prediction error signal alone.

In order to realize the special decoding process, the decode control module 212, as shown in FIG. 42, includes the interpolation process control module 402 described in the second embodiment and the weighted prediction control module 405 described in the fifth embodiment. When the load on the computer 10 is greater than a predetermined reference value, the interpolation process control module 402 alters the content of the pixel interpolation process so as to reduce the load on the computer 10. When the load on the computer 10 is greater than a predetermined reference value, the weighted prediction control module 405 executes a weighted prediction control process including a process for determining whether the value of the weighting factor is less than a predetermined value, and a process for setting the weighted prediction signal at zero if the value of the weighting factor is less than the predetermined value.

Referring now to a flow chart of FIG. 43, the procedure of the decoding process that is executed by the video reproduction application program 201 is described.

While the decoding process is being executed, the video reproduction application program 201 periodically repeats the process for detecting current load on the computer 10 by inquiring of the OS about the current load of computer 10 (step S2201). In step S2201, the video reproduction application program 201 acquires, from the OS, the current usage of the CPU 111 (processor usage) and the current usage of the main memory 113 (memory usage).

The video reproduction application program 201 checks whether the current load amount of the computer 10 is greater than a predetermined reference value, thereby determining whether the computer 10 is in the high load state or not (step S2202). In step S2202, for example, the video reproduction application program 201 determines whether the current processor usage is greater than a predetermined processor reference usage, and also determines whether the current memory usage is greater than a predetermined memory reference usage. If at least one of the current processor usage and the current memory usage is greater than the associated reference usage, the video reproduction application program 201 determines that the computer 10 is in the high load state. If each of the current processor usage and the current memory usage is not greater than the associated reference usage, the video reproduction application program 201 determines that the computer 10 is not in the high load state.

If the computer 10 is not in the high load state (NO in step S2202), the video reproduction application program 201 selects the above-mentioned normal decoding process as the decoding process to be executed by the CPU 111, and executes the above-described series of processes on the CPU 111, as described with reference to FIG. 4 (step S2203). Unless the computer 10 goes into the high load state, that is, unless the decoding performance decreases, the motion video stream is decoded by the normal decoding process.

On the other hand, if the computer 10 is in the high load state (YES in step S2202), the video reproduction application program 201 executes the special decoding process in which the content of the interpolation process for use in the interpolation prediction is simplified and the content of the weighted prediction process is simplified (step S2204). In the special decoding process, the video reproduction application program 201 alters the content of the pixel interpolation process so as to reduce the load on the computer 10. Specifically, the video reproduction application program 201 executes (1) a process for varying the pixel precision of interpolation pixels that are to be generated by the pixel interpolation process, (2) a process for varying the number of taps of the filter for executing the pixel interpolation process, and (3) a process for skipping the execution of the pixel interpolation process. Further, the video reproduction application program 201 determines whether the value of the weighting factor corresponding to the to-be-decoded picture is less than a predetermined value. If the value of the weighting factor is not less than the predetermined value, the video reproduction application program 201 executes the normal weighted prediction process that multiplies the inter-frame prediction signal, which is generated by the simplified interpolation process, by the weighting factor. Thereby, the weighted prediction signal corresponding to the to-be-decoded picture is generated. The video reproduction application program 201 generates decoded video by adding the prediction error signal and the weighted prediction signal.

If the value of the weighting factor is less than the predetermined value, this value is regarded as zero. In this case, the weighted prediction signal of "zero" is output. The video reproduction application program 201 does not add the prediction error signal and the weighted prediction signal, and outputs the prediction error signal as decoded video corresponding to the to-be-decoded picture.

Until the motion video stream is completely decoded, the above-described process of steps S2201 to S2204 is repeated (step S2205).

By making use of both the special interpolation prediction decoding process and the weighted prediction control process, the load on the computer 10, which relates to the decoding process, can further be reduced, and smooth motion video reproduction is realized.

In the eleventh embodiment, the weighted prediction control process may be executed on condition that the computer 10 is in the high load state and the to-be-decoded picture is a non-reference picture. Thereby, the processing amount in the decoding process can efficiently be reduced while degradation in image quality can be minimized.

FIG. 43 illustrates the procedure of the weighted prediction control process.

If the computer 10 is not in the high load state (NO in step S2301), the video reproduction application program 201 executes, as in the normal case, the weighted prediction process that generates the weighted prediction signal by multiplying the inter-frame prediction signal by the weighting factor (step S2302).

On the other hand, if the computer 10 is in the high load state (YES in step S2301), the video reproduction application program 201 determines, based on the syntax information, whether the to-be-decoded picture is a non-reference picture (step S2303). If the to-be-decoded picture is not a non-reference picture but a reference picture that is referred to by other pictures (NO in step S2303), the video reproduction application program 201 executes the weighted prediction process as in the normal case (step S2302).

If the to-be-decoded picture is a non-reference picture (YES in step S2303), the video reproduction application program 201 executes the weighted prediction control process. In this case, the video reproduction application program 201 determines whether the weighting factor corresponding to the to-be-decoded picture is less than the predetermined value (step S2404). If the weighting factor is less than the predetermined value (YES in step S2404), the video reproduction application program 201 outputs the weighted prediction signal of "zero" (step S2305)

The decode control process according to the eleventh embodiment is entirely realized by the computer program.

Thus, only by installing the computer program in an ordinary computer via a computer-readable memory medium, can the same advantage as with the eleventh embodiment easily be attained.

The software decoders, which have been described in the first to eleventh embodiments, are applicable to not only personal computers, but also to PDAs, mobile phones, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus that decodes a compression-encoded motion video stream, comprising:
   a motion compensation prediction module configured to execute a motion compensation prediction process that includes a process of subjecting a decoded picture to a pixel interpolation process, and a process of generating an inter-frame prediction signal, which corresponds to a to-be-decoded picture, from the picture that is subjected to the pixel interpolation process, on the basis of motion vector information that is included in the motion video stream, wherein the motion compensation prediction module includes (i) a first pixel interpolation module configured to subject the decoded picture to a first pixel interpolation process of a first decimal pixel precision using a first filter with n taps, (ii) a second pixel interpolation module configured to subject the decoded picture to a second pixel interpolation process of the first decimal pixel precision using a second filter with m taps, the m being smaller than the n, and (iii) a third pixel interpolation module configured to subject the decoded picture to a third pixel interpolation process of a second decimal pixel precision using both the first filter with the n taps and the second filter with the m taps, the second decimal pixel precision being higher than the first decimal pixel precision;
   an adder configured to add the inter-frame prediction signal to a prediction error signal that corresponds to the to-be-decoded picture, thereby to decode the to-be-decoded picture;
   a detecting module configured to detect a load on the information processing apparatus; and
   a control module configured to selectively operate the first pixel interpolation module, the second pixel interpolation module and the third pixel interpolation module based on the detected load.

2. The information processing apparatus according to claim 1, further comprising:
   means for executing an inverse orthogonal transformation process in units of a predetermined block for the to-be-decoded picture, thereby to generate the prediction error signal corresponding to the to-be-decoded picture; and
   means for executing, when the detected load is greater than the predetermined reference value, an inverse orthogonal transformation control process that includes a process of detecting a block, whose prediction error component is less than a predetermined value, from a plurality of blocks that form the to-be-decoded picture, on the basis of values of orthogonal transformation coefficients included in each of the plurality of blocks, and a process of skipping execution of the inverse orthogonal transformation process for the detected block and setting the prediction error signal for the detected block at zero.

3. The information processing apparatus according to claim 2, wherein the means for executing the inverse orthogonal transformation control process executes the inverse orthogonal transformation control process on condition that the to-be-decoded picture is a non-reference picture that is not referred to by other pictures and that the detected load is greater than the predetermined reference value.

4. The information processing apparatus according to claim 1, further comprising:
   means for executing a weighted prediction process that generates a weighted prediction signal, which corresponds to the to-be-decoded picture, by multiplying the inter-frame prediction signal, which corresponds to the to-be-decoded picture, by a weighting factor;
   means for executing, when the detected load is greater than the predetermined reference value, a weighted prediction control process that includes a process of determining whether a value of the weighting factor is less than a predetermined value, and a process of setting the weighted prediction signal at zero if the value of the weighting factor is less than the predetermined value, wherein the means for adding adds the weighted prediction signal to the prediction error signal that corresponds to the to-be-decoded picture.

5. The information processing apparatus according to claim 4, wherein the means for executing the weighted prediction control process executes the weighted prediction control process on condition that the to-be-decoded picture is a non-reference picture that is not referred to by other pictures and that the detected load is greater than the predetermined reference value.

6. A computer-readable medium having stored thereon a program which causes a computer to decode a compression-encoded motion video stream, said program comprising:
   causing the computer to execute a motion compensation prediction process that includes a process of subjecting a decoded picture to a pixel interpolation process, and a process of generating an inter-frame prediction signal, which corresponds to a to-be-decoded picture, from the picture that is subjected to the pixel interpolation process, on the basis of motion vector information that is included in the motion video stream, wherein the motion compensation prediction process (i) to subject the decoded picture to a first pixel interpolation process of a first decimal pixel precision using a first filter with n taps, (ii) to subject the decoded picture to a second pixel interpolation process of the first decimal pixel precision using a second filter with m taps, the m being smaller than the n, and (iii) to subject the decoded picture to a third pixel interpolation process of a second decimal pixel precision using both the first filter with the n taps and the second filter with the m taps, the second decimal pixel precision being higher than the first decimal pixel precision;
   causing the computer to add the inter-frame prediction signal to a prediction error signal that corresponds to the to-be-decoded picture in order to decode the to-be-decoded picture;
   causing the computer to detect a load on the computer; and
   causing the computer to selectively subject the decoded picture to the first pixel interpolation process, the second pixel operation process and the third pixel operation process based on the detected load.

* * * * *